United States Patent
Ng et al.

(10) Patent No.: US 9,642,140 B2
(45) Date of Patent: May 2, 2017

(54) METHODS OF UL TDM FOR INTER-ENODEB CARRIER AGGREGATION

(71) Applicant: Samsung Electronics Co., Ltd., Suwon-si, Gyeonggi-do (KR)

(72) Inventors: Boon Loong Ng, Dallas, TX (US); Thomas Novlan, Dallas, TX (US); Aris Papasakellariou, Houston, TX (US); Young-Han Nam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 502 days.

(21) Appl. No.: 14/304,459

(22) Filed: Jun. 13, 2014

(65) Prior Publication Data

US 2014/0369242 A1  Dec. 18, 2014

Related U.S. Application Data

(60) Provisional application No. 61/836,532, filed on Jun. 18, 2013, provisional application No. 61/858,018, filed on Jul. 24, 2013.

(51) Int. Cl.
| | | |
|---|---|---|
| *H04W 72/04* | (2009.01) | |
| *H04L 5/14* | (2006.01) | |
| *H04L 5/00* | (2006.01) | |
| *H04W 28/08* | (2009.01) | |
| *H04W 72/12* | (2009.01) | |

(52) U.S. Cl.
CPC ......... *H04W 72/0453* (2013.01); *H04L 5/001* (2013.01); *H04L 5/0098* (2013.01); *H04L 5/1469* (2013.01); *H04W 28/08* (2013.01); *H04W 72/1289* (2013.01)

(58) Field of Classification Search
None
See application file for complete search history.

(56) References Cited

U.S. PATENT DOCUMENTS 8,861,457 B2 * 10/2014 Xu ............................ H04L 1/00
  370/329
2006/0135075 A1 * 6/2006 Tee ....................... H04L 5/0007
  455/67.13

(Continued)

FOREIGN PATENT DOCUMENTS

| JP | 2011-508502 A | 3/2011 |
| KR | 10-2012-00080627 A | 7/2012 |
| KR | 10-2012-085247 A | 7/2012 |

OTHER PUBLICATIONS

International Search Report of the International Searching Authority dated Sep. 18, 2014, in connection with International Patent Application No. PCT/KR2014/005355; 3 pages.

(Continued)

*Primary Examiner* — Brian Roberts

(57) ABSTRACT

One or more embodiments provide a method implemented in a user equipment (UE) used in a wireless communications system. The method includes transmitting an indication to a base station that the UE is capable of transmitting on a single uplink carrier frequency and downlink carrier aggregation. The method also includes receiving an uplink carrier frequency switching pattern from the base station. The method also includes switching uplink carrier frequencies based on the uplink carrier frequency switching pattern.

20 Claims, 14 Drawing Sheets

(56) References Cited

U.S. PATENT DOCUMENTS

| | | | |
|---|---|---|---|
| 2009/0175233 A1 | 7/2009 | Ojala et al. | |
| 2011/0158089 A1 | 6/2011 | Sambhwani et al. | |
| 2011/0207495 A1* | 8/2011 | Gerstenberger | H04W 72/0453 455/509 |
| 2012/0057544 A1 | 3/2012 | Xu et al. | |
| 2012/0114014 A1 | 5/2012 | Gaal et al. | |
| 2012/0188976 A1 | 7/2012 | Kim et al. | |
| 2013/0136006 A1* | 5/2013 | Kim | H04L 5/001 370/241 |
| 2014/0141787 A1* | 5/2014 | Marque-Pucheu | H04W 72/005 455/447 |

OTHER PUBLICATIONS

Written Opinion of the International Searching Authority dated Sep. 18, 2014, in connection with International Patent Application No. PCT/KR2014/005355; 4 pages.

\* cited by examiner

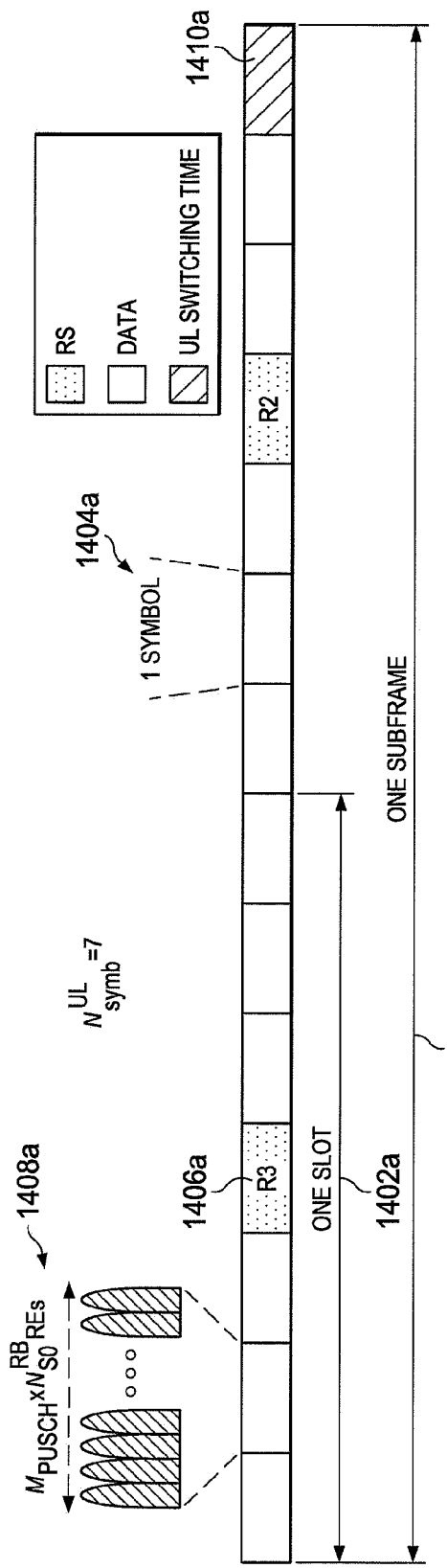
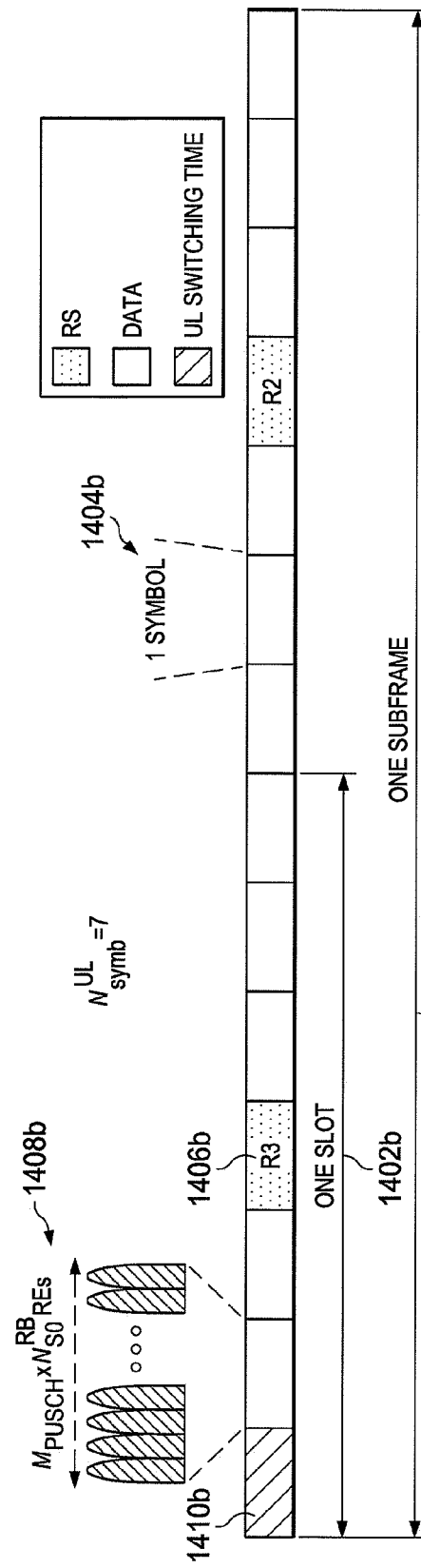
FIG. 14A
FIG. 14B

METHODS OF UL TDM FOR INTER-ENODEB CARRIER AGGREGATION

CROSS-REFERENCE TO RELATED APPLICATION(S) AND CLAIM OF PRIORITY

The present application claims priority to U.S. Provisional Patent Application Ser. No. 61/836,532, filed Jun. 18, 2013, entitled "METHODS OF UL TDM FOR INTER-ENODEB CARRIER AGGREGATION," and U.S. Provisional Patent Application Ser. No. 61/858 018, filed Jul. 24, 2013, entitled "JOINT OPERATION OF A FDD CARRIER AND A IUD CARRIER WITH NON-IDEAL BACKHAUL". The content of each of the above-identified patent documents is incorporated herein by reference.

TECHNICAL FIELD

The present application relates generally to wireless communication systems and, more specifically, to uplink carrier switching for inter-eNodeB or inter-site carrier aggregation.

BACKGROUND

In Rel-10 LTE, the UE can be configured with multiple downlink carrier frequencies for downlink carrier aggregation and only one uplink carrier frequency. The primary component carrier comprises of a pair of downlink and uplink carriers (on different frequencies for FDD system and on the same frequency for TDD system), while the secondary component carrier may comprise only a single downlink carrier frequency with no uplink carrier frequency. Layer 1 uplink control information associated with the secondary component carrier is always transmitted on the primary component carrier.

There is benefit to enable aggregation of two or more downlink carrier frequencies for a UE where different carrier frequency is associated with different eNodeB and the eNodeBs concerned may not be co-located at the same site (inter-site inter-eNodeB carrier aggregation). This is also known as non-co-channel dual connectivity. A certain deployment scenario may have different neighboring eNodeB configured with different downlink and uplink carrier pair. A certain deployment scenario may also have the eNodeBs interconnected with slow backhaul (e.g. 40 ms on-way transmission latency).

When inter-eNodeB carrier aggregation is configured, the traffic to the UE may predominantly flow through a particular carrier. In one example, traffic with best effort QoS may predominantly flow through one carrier while traffic with stricter QoS may predominantly flow through another carrier. In another example, traffic may predominantly flow through one carrier because the corresponding path loss may be lower.

When the UE is configured with carrier aggregation where a first eNodeB is associated with the primary component carrier and a second eNodeB is associated with the secondary component carrier, it is not desirable for the UE to transmit Layer 1 uplink control information corresponding to the second component carrier to the primary component carrier due to the excessive latency incurred for the first eNodeB to transmit the Layer 1 uplink control information corresponding to the second component carrier to the second eNodeB over the X2 interface. Therefore, there is a need to transmit uplink control information and uplink data associated with an eNodeB directly over the air to the eNodeB concerned when inter-site inter-eNodeB carrier aggregation is configured.

SUMMARY

An embodiment provides a method implemented in a user equipment (UE) used in a wireless communications system. The method includes transmitting an indication to a base station that the UE is capable of transmitting on a single uplink carrier frequency and downlink carrier aggregation. The method also includes receiving an uplink carrier frequency switching pattern from the base station. The method also includes switching uplink carrier frequencies based on the uplink carrier frequency switching pattern.

An embodiment provides a method implemented in a base station used in a wireless communications system. The method includes receiving an indication that user equipment (UE) is capable of transmitting on a single uplink carrier frequency and downlink carrier aggregation. The method also includes transmitting an uplink carrier frequency switching pattern from the base station. The UE switches uplink carrier frequencies based on the uplink carrier frequency switching pattern.

An embodiment provides a user equipment (UE) used in a wireless communications system. The UE includes a transceiver and a controller. The transceiver is configured to transmit an indication to a base station that the UE is capable of transmitting on a single uplink carrier frequency and downlink carrier aggregation and receive an uplink carrier frequency switching pattern from the base station. The controller is configured to switch uplink carrier frequencies based on the uplink carrier frequency switching pattern.

An embodiment provides a base station used in a wireless communications system. The base station includes a transceiver. The transceiver is configured to receive an indication that user equipment (UE) is capable of transmitting on a single uplink carrier frequency and downlink carrier aggregation and transmit an uplink carrier frequency switching pattern from the base station. The UE switches uplink carrier frequencies based on the uplink carrier frequency switching pattern.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 14A-14B illustrate example of PUSCH in subframes according to this disclosure;

DETAILED DESCRIPTION

FIGS. 1 through 18, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
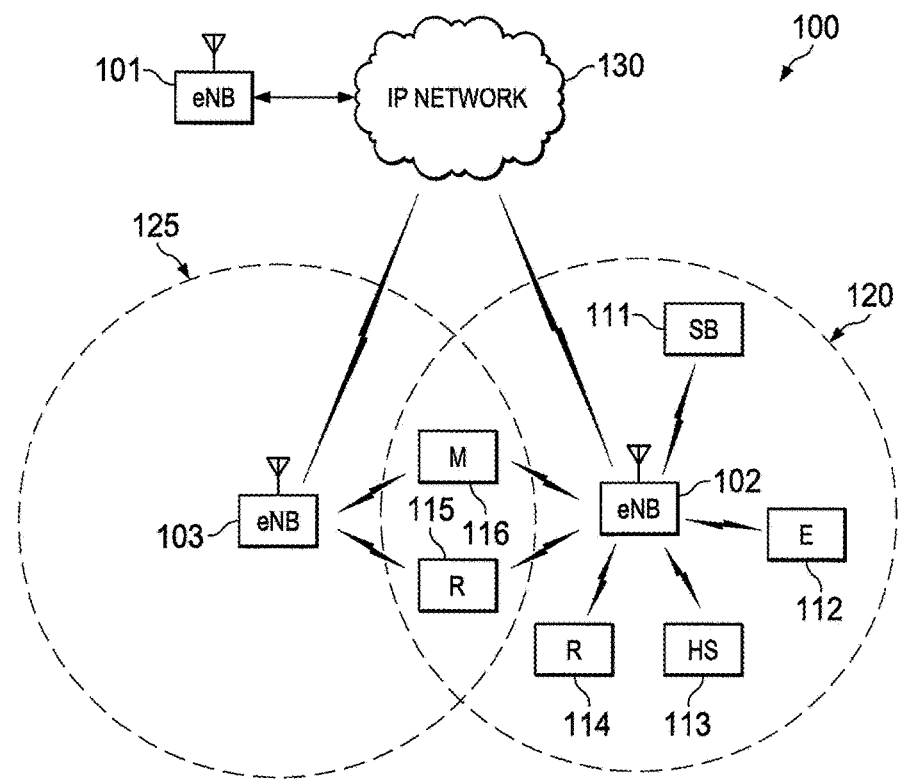
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a Wi-Fi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, Wi-Fi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, an embodiment provides a method implemented in a base station used in a wireless communications system. The method includes receiving an indication that user equipment (UE) is capable of transmitting on a single uplink carrier frequency and downlink carrier aggregation. The method also includes transmitting an uplink carrier frequency switching pattern from the base station. The UE switches uplink carrier frequencies based on the uplink carrier frequency switching pattern.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
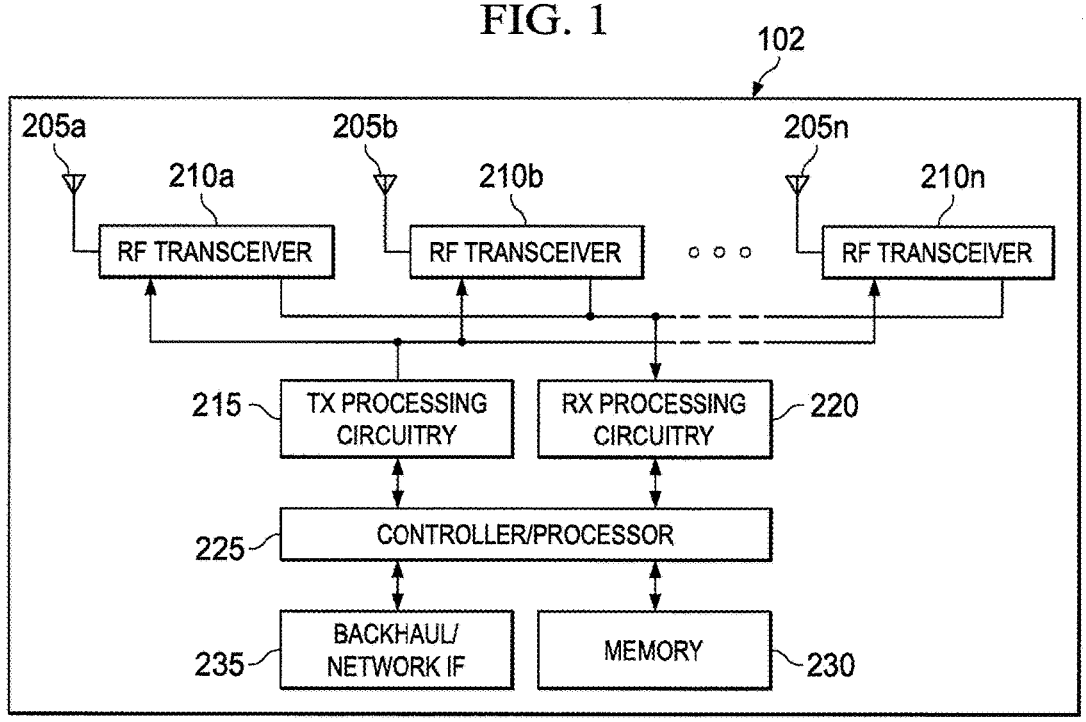
FIG. 2 illustrates an example eNodeB (eNB) according to this disclosure.

FIG. 2 illustrates an example eNB 102 according to this disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
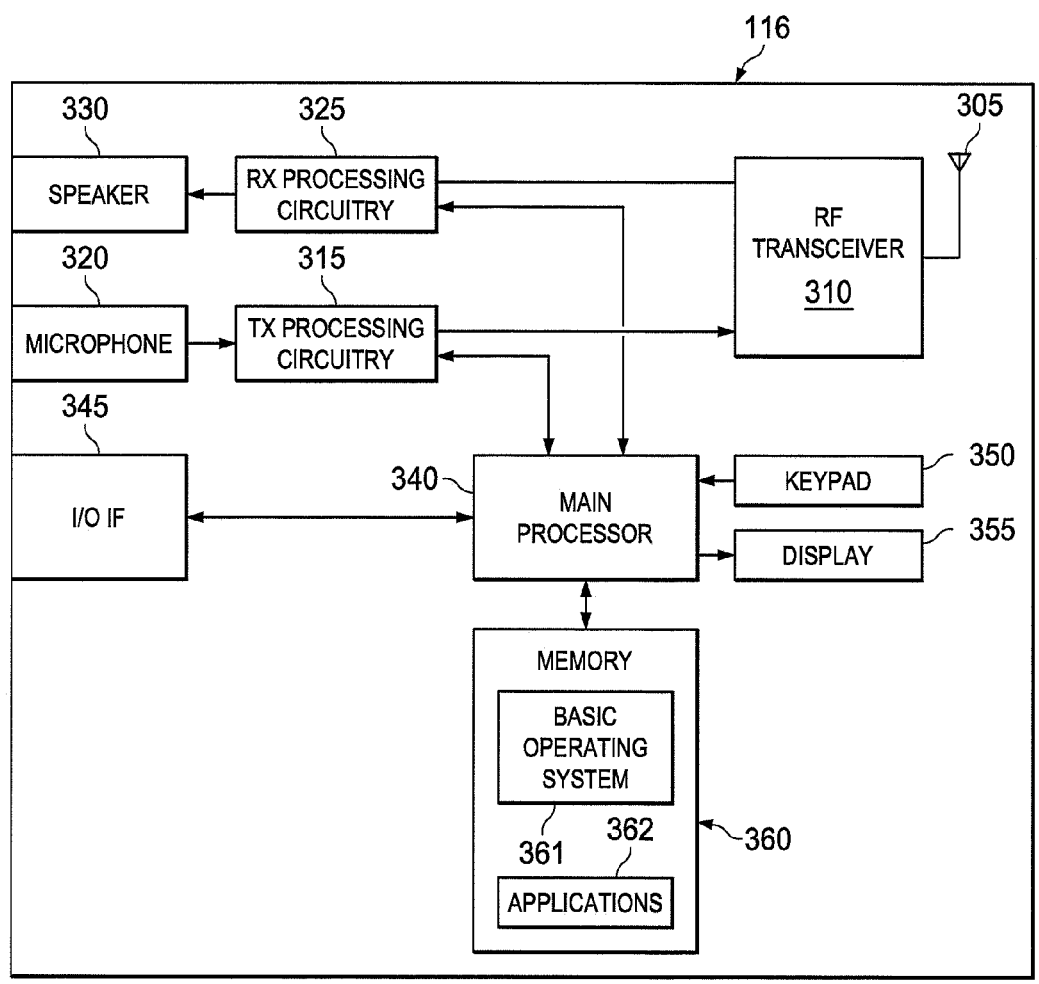
FIG. 3 illustrates an example user equipment (UE) according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

One or more embodiments of the disclosure relate to wireless communication systems and, more specifically, to an aggregation of a carrier using Frequency Division Duplexing (FDD) and of a carrier using Time Division Duplexing (TDD). A communication system includes a DownLink (DL) that conveys signals from transmission points such as Base Stations (BSs) or NodeBs to User Equipments (UEs) and an UpLink (UL) that conveys signals from UEs to reception points such as NodeBs. A UE, also commonly referred to as a terminal or a mobile station, may be fixed or mobile and may be a cellular phone, a personal computer device, etc. A NodeB, which is generally a fixed station, may also be referred to as an access point or other equivalent terminology.

DL signals include data signals conveying information content, control signals conveying DL Control Information (DCI), and Reference Signals (RS), which are also known as pilot signals. A NodeB transmits data information or DCI through respective Physical DL Shared CHannels (PDSCHs) or Physical DL Control CHannels (PDCCHs). A NodeB transmits one or more of multiple types of RS including a UE-Common RS (CRS), a Channel State Information RS (CSI-RS), and a DeModulation RS (DMRS). A CRS is transmitted over a DL system BandWidth (BW) and can be used by UEs to demodulate data or control signals or to perform measurements. To reduce CRS overhead, a NodeB may transmit a CSI-RS with a smaller density in the time and/or frequency domain than a CRS. For channel measurement, Non-Zero Power CSI-RS (NZP CSI-RS) resources can be used. For Interference Measurement Reports (IMRs), CSI Interference Measurement (CSI-IM) resources associated with a Zero Power CSI-RS (ZP CSI-RS) can be used. A UE can determine the CSI-RS transmission parameters through higher layer signaling from a NodeB. DMRS is transmitted only in the BW of a respective PDSCH and a UE can use the DMRS to demodulate information in a PDSCH.

Figure 4:
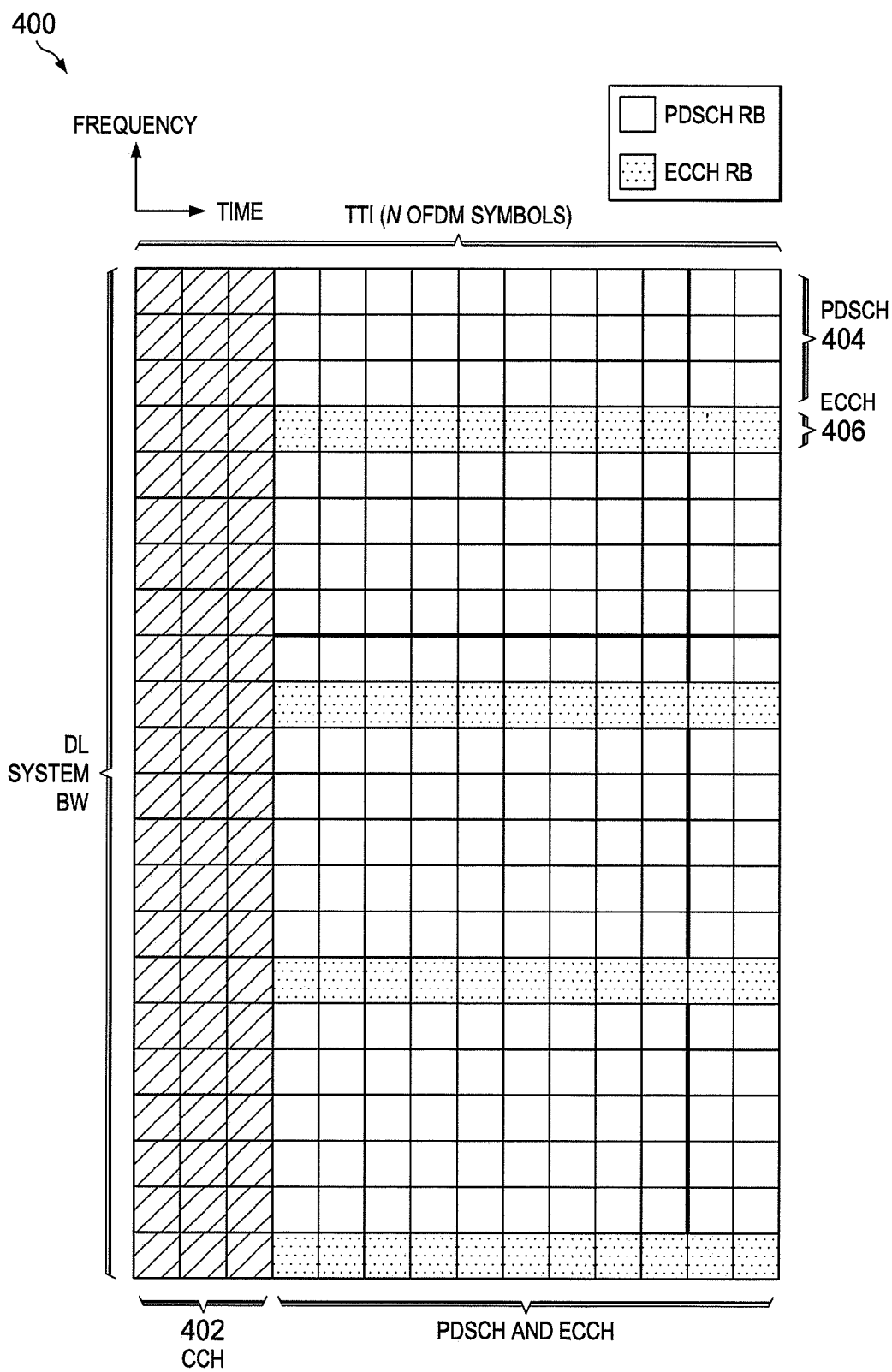
FIG. 4 illustrates a structure of a DL Transmission Time Interval (TTI) according to this disclosure.

FIG. 4 illustrates a structure of a DL Transmission Time Interval (TTI) 400 according to this disclosure. The embodiment of the TTI 400 illustrated in FIG. 4 is for illustration only, and the UEs 111-115 of FIG. 1 could have the same or similar configuration. However, UEs come in a wide variety of configurations, and FIG. 4 does not limit the scope of this disclosure to any particular implementation of a UE.

As shown in FIG. 4, the TTI 400 includes OFDM symbols 402, OFDM symbols 404, and OFDM symbols 406. In one embodiment, the UE can be configured with TTI 400 and the UE could retune its uplink carrier frequency in accordance with the TTI 400.

Referring to FIG. 4, DL signaling uses Orthogonal Frequency Division Multiplexing (OFDM) and a DL TTI includes N=14 OFDM symbols in the time domain and K Resource Blocks (RBs) in the frequency domain. A first type of Control CHannels (CCHs) is transmitted in a first N1 OFDM symbols 402 (including no transmission, $N_1=0$). A remaining N−$N_1$ OFDM symbols 404 are used primarily for transmitting PDSCHs and, in some RBs of a TTI, for transmitting a second type of CCHs (ECCHs) 406.

UL signals also include data signals conveying information content, control signals conveying UL Control Information (UCI), and RS. A UE transmits data information or UCI through a respective Physical UL Shared CHannel (PUSCH) or a Physical UL Control CHannel (PUCCH). If a UE simultaneously transmits data information and UCI, it may multiplex both in a PUSCH. UCI includes Hybrid Automatic Repeat reQuest ACKnowledgement (HARQ-ACK) information, indicating correct or incorrect detection of data Transport Blocks (TBs) in a PDSCH, Service Request (SR) indicating whether a UE has data in its buffer, and Channel State Information (CSI) enabling a NodeB to select appropriate parameters for PDSCH or PDCCH transmissions to a UE. UL RS includes DMRS and Sounding RS (SRS). DMRS is transmitted only in a BW of a respective PUSCH or PUCCH and primarily serves to enable coherent demodulation of information in a PUSCH or PUCCH at a NodeB. SRS is transmitted by a UE to provide a NodeB with an UL CSI. For initial access or for subsequent synchronization purposes, a UE can also be configured by a NodeB to transmit a Random Access CHannel (RACH).

Figure 5:
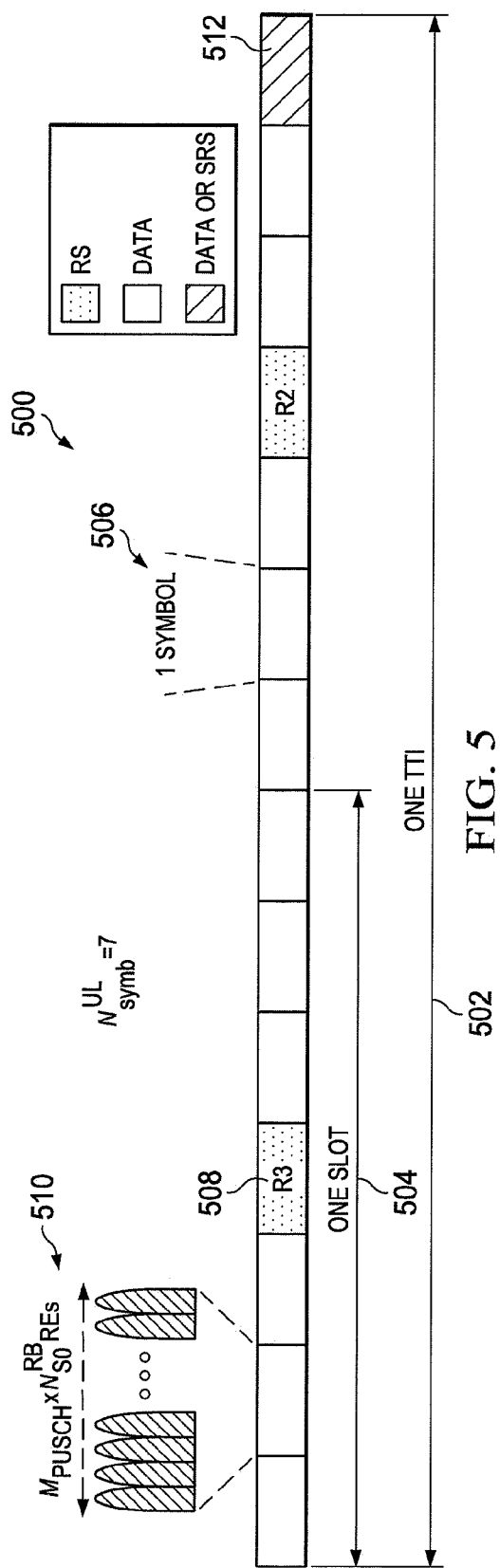
FIG. 5 illustrates a structure of a UL TTI for a PUSCH transmission according to this disclosure.

FIG. 5 illustrates a structure 500 of a UL TTI 502 for a PUSCH transmission according to this disclosure. The embodiment of the structure 500 illustrated in FIG. 5 is for illustration only, and the UEs 111-115 of FIG. 1 could have the same or similar configuration. However, UEs come in a wide variety of configurations, and FIG. 5 does not limit the scope of this disclosure to any particular implementation of a UE.

As shown in FIG. 5, the structure 500 includes uplink TTI 502, slot 504, symbol 506, DMRS slot 508, resource block 510, and symbol 512. In one embodiment, the UE can be configured with structure 500 and the UE could retune its uplink carrier frequency in accordance with the structure 500.

Referring to FIG. 5, UL signaling uses Discrete Fourier Transform Spread OFDM (DFT-S-OFDM) and an UL TTI 502 includes two slots. Each slot 504 includes $N_{symb}^{UL}$ symbols 506 for transmitting data information, UCI, or RS. Some PUSCH symbols in each slot are used for transmitting DMRS 508. A transmission BW includes RBs with each RB including $N_{sc}^{RB}$ sub-carriers, or Resource Elements (REs). A UE is allocated $M_{PUSCH}$ RBs 510 for a total of $M_{sc}^{PUSCH}=M_{PUSCH} \cdot N_{sc}^{RB}$ REs for a PUSCH transmission BW. The last TTI symbol may be used to multiplex SRS transmissions 512 from one or more UEs. A number of TTI symbols available for data/UCI/DMRS transmission is $N_{symb}^{PUSCH}=2 \cdot (N_{symb}^{UL}-1)-N_{SRS}$, where $N_{SRS}=1$ if a TTI supports SRS transmissions and a PUSCH transmission BW at least partially overlap with a SRS transmission BW and $N_{SRS}=0$ otherwise.

Figure 6:
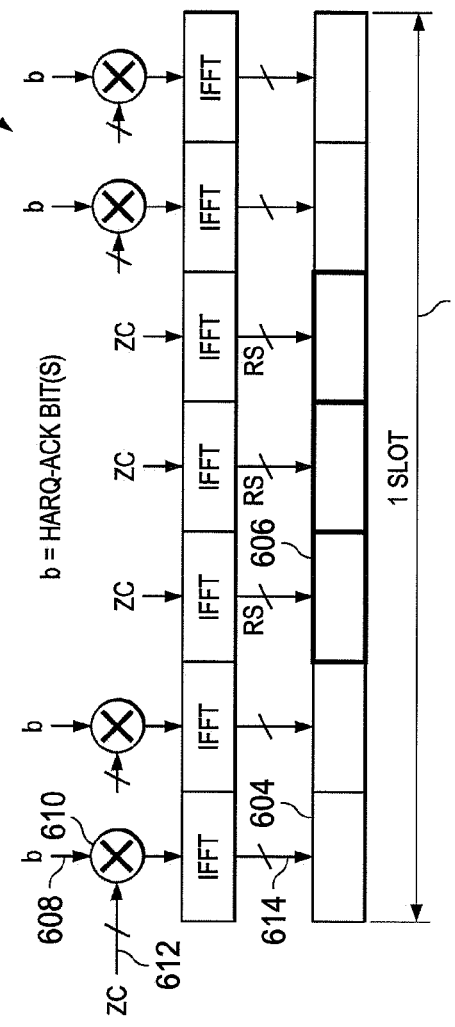
FIG. 6 illustrates a structure for a first PUCCH format for transmitting a HARQ-ACK signal in a TTI according to this disclosure.

FIG. 6 illustrates a structure 600 for a first PUCCH format for transmitting a HARQ-ACK signal in a TTI according to this disclosure. The embodiment of the structure 600 illustrated in FIG. 6 is for illustration only, and the UEs 111-115 of FIG. 1 could have the same or similar configuration. However, UEs come in a wide variety of configurations, and FIG. 6 does not limit the scope of this disclosure to any particular implementation of a UE.

As shown in FIG. 6, the structure 600 includes slot 602, symbols 604-606, HARQ-ACK bits b 608, modulate 610, Zadoff-Chu sequence 612, and transmission 614. In one embodiment, the UE can be configured with structure 600 and the UE could retune its uplink carrier frequency in accordance with the structure 600.

Referring to FIG. 6, a TTI includes two slots and each slot 602 includes $N_{symb}^{UL}$ symbols 604-606 for transmitting HARQ-ACK signals (symbol 604) or RS (symbol 606) in a RB. HARQ-ACK bits 608 modulate 610 a Zadoff-Chu (ZC) sequence 612 of length $N_{sc}^{RB}$ using Binary Phase Shift Keying (BPSK) or Quaternary Phase Shift Keying (QPSK) modulation. A HARQ-ACK bit can have a numeric value of −1 if it conveys a positive ACKnowledgement (ACK) for a correct detection of a data TB and a numeric value of 1 if it conveys a Negative ACKnowledgement (NACK) for a correct detection of a data TB. In general, absence of a data TB reception is referred to as DTX and can have a same representation as a NACK. A modulated ZC sequence is transmitted 614 after performing an Inverse Fast Frequency Transform (IFFT). A RS is transmitted through an unmodulated ZC sequence.

A first PUCCH format with structure as in FIG. 6 is capable of supporting transmission of only one or two HARQ-ACK bits. When multiple PUCCH resources exist for a UE to select for HARQ-ACK signal transmission, a combination of PUCCH resource selection and a use of a first PUCCH format as in FIG. 6, referred to as PUCCH format 1b, can support transmissions of up to four HARQ-ACK bits. A second PUCCH format, referred to as PUCCH format 3, can also be used to transmit a large number of HARQ-ACK bits such as, for example, up to 22 bits.

Figure 7:
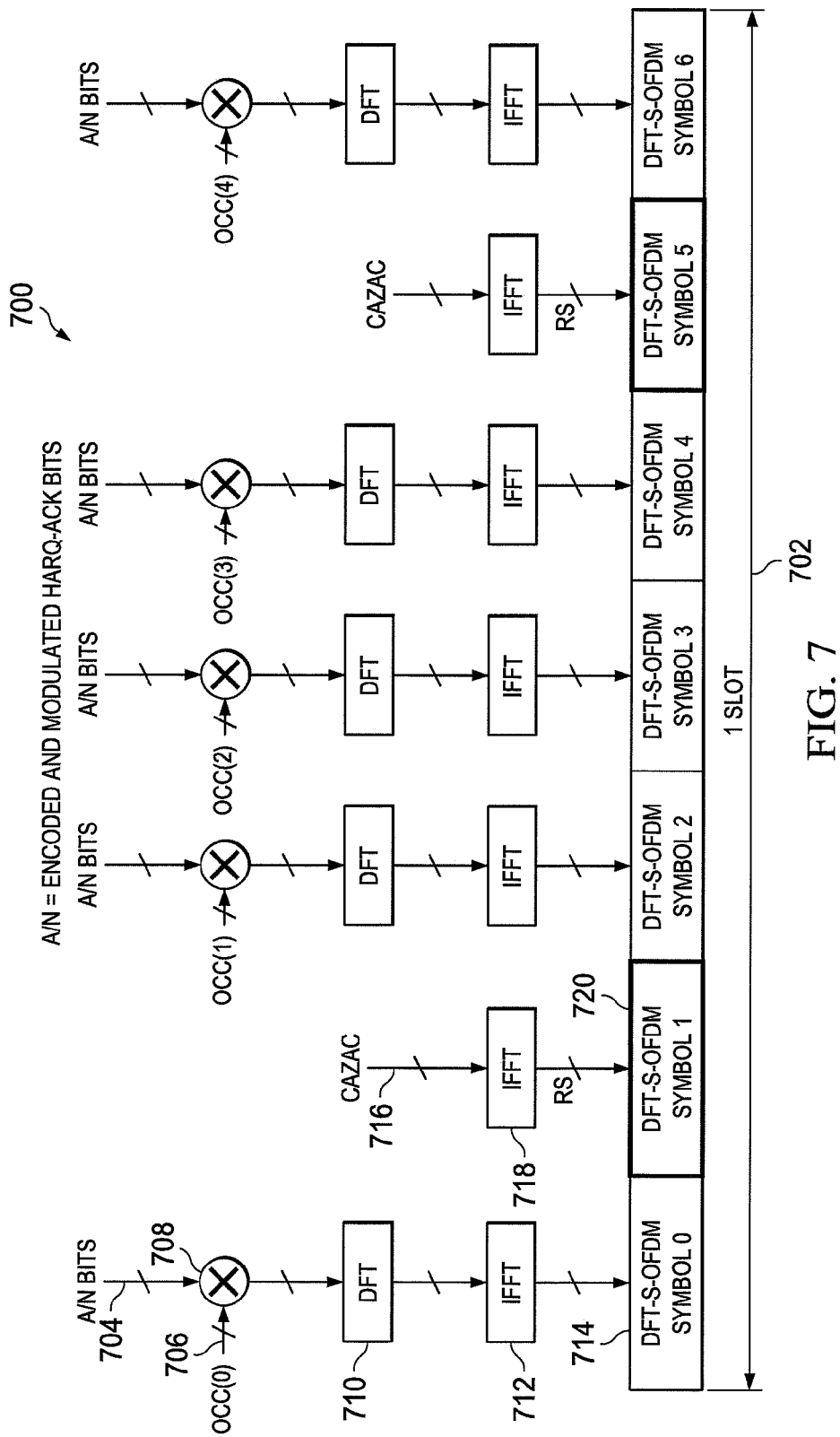
FIG. 7 illustrates a structure for a second PUCCH format for transmitting a HARQ-ACK signal in a TTI according to this disclosure.

FIG. 7 illustrates a structure 700 for a second PUCCH format for transmitting a HARQ-ACK signal in a TTI according to this disclosure. The embodiment of the structure 700 illustrated in FIG. 7 is for illustration only, and the UEs 111-115 of FIG. 1 could have the same or similar configuration. However, UEs come in a wide variety of configurations, and FIG. 7 does not limit the scope of this disclosure to any particular implementation of a UE.

As shown in FIG. 7, the structure 700 includes slot 702, HARQ-ACK bits 704, Orthogonal Covering Code (OCC) 706, multiplier 708, DFT precoder 710, IFFT 712, symbol 714, sequence 716, IFFT 718, and symbol 720. In one embodiment, the UE can be configured with structure 700 and the UE could retune its uplink carrier frequency in accordance with the structure 700.

Referring to FIG. 7, a TTI includes two slots and each slot 702 includes symbols for transmitting HARQ-ACK signals or RS in a RB. HARQ-ACK signal transmission uses DFT-S-OFDM. After encoding and modulation, using respectively a block code such as a Reed-Muller (RM) code and Quaternary Phase Shift Keying (QPSK), respectively, a set of same HARQ-ACK bits 704 is multiplied by multiplier 708 with elements of an Orthogonal Covering Code (OCC) 706 and is subsequently DFT precoded by DFT precoder 710. For example, for five DFT-S-OFDM symbols per slot for HARQ-ACK signal transmission, an OCC of length five is used. An output is passed through an IFFT 712 and it is then mapped to a DFT-S-OFDM symbol 714. As the operations are linear, their relative order may be inter-changed. Same or different HARQ-ACK bits may be transmitted in a second slot of a TTI. RS is also transmitted in each slot to enable coherent demodulation of HARQ-ACK signals. A RS is constructed from a ZC sequence 716 of length $N_{sc}^{RB}$ which is passed through an IFFT 718 and mapped to another DFT-S-OFDM symbol 720.

If a UE detects for a cell c a DL DCI format scheduling a PDSCH reception with one data TB or with two data TBs and the UE applies bundling (using an XOR operation) between two HARQ-ACK information bits generated in response to a reception of the two data TBs (spatial-domain bundling), the UE generates $o_c=1$ HARQ-ACK information bit (in case one data TB is conveyed when a configured transmission mode is for two data TBs, an ACK is assumed for the not transmitted data TB); otherwise, the UE generates $o_c=2$ HARQ-ACK information bits.

A PDSCH transmission to a UE or a PUSCH transmission from a UE can be either dynamically scheduled or Semi-Persistently Scheduled (SPS). Dynamic transmissions are triggered by a DCI format that is conveyed by a PDCCH and includes fields providing PDSCH or PUSCH transmission parameters while SPS transmission parameters are configured to a UE from a NodeB through higher layer signaling such as Radio Resource Control (RRC) signaling. A DCI format scheduling a PDSCH transmission is referred to as DL DCI format while a DCI format scheduling a PUSCH transmission is referred to as UL DCI format.

In a TDD communication system, the communication direction in some TTIs is in the DL and in some other TTIs is in the UL. Table 1 lists indicative TDD UL-DL configurations over a period of 10 TTIs which is also referred to as frame period. "D" denotes a DL TTI, "U" denotes an UL TTI, and "S" denotes a special TTI which includes a DL transmission field referred to as DwPTS, a Guard Period (GP), and an UL transmission field referred to as UpPTS. Several combinations exist for the duration of each field in a special TTI subject to the condition that the total duration is one TTI.

TABLE 1

| TDD UL-DL Configuration | DL-to-UL Switch-point periodicity | TTI number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In a Time Division Duplex (TDD) system, a HARQ-ACK signal transmission from a UE in response to PDSCH receptions in multiple DL TTIs may be transmitted in a same UL TTI. A number M of DL TTIs for which associated HARQ-ACK signal transmissions from UEs are in a same UL TTI is referred to as a bundling window of size M. One consequence of TDD operation is that a HARQ-ACK signal transmission from a UE or a NodeB in response to a data Transport Block (TB) reception may not occur as early as for FDD where both DL signaling and UL signaling can be supported in a same TTI using different frequencies. Table 2 indicates DL TTIs n−k, where k∈K, for which an HARQ-ACK signal transmission is in UL TTI n. For example, for TDD operation and UL-DL configuration 5, a HARQ-ACK signal transmission from a UE in response to a data TB reception in TTI number 9 occurs after 13 TTIs while for FDD operation a HARQ-ACK signal transmission from a UE in response to a data TB reception in a TTI always occurs after four TTIs.

missed detecting any DCI format in a previous DL TTI and can incorporate such events in a HARQ-ACK signal transmission for a respective bundling window. Additionally, UL DCI formats include a UL DAI field informing a UE of a total number of DL DCI formats (PDSCHs or a SPS release) transmitted to a UE in respective TTIs of an associated bundling window. Using a value of an UL DAI field, a UE provides HARQ-ACK information in a respective PUSCH for a number of DCI formats in a respective bundling window. For example, an UL DCI format can include an UL DAI field of 2 bits with a value of '00' indicating inclusion of HARQ-ACK bits for 0 or 4 DL DCI formats (a UE selects 4 if it detected at least one DL DCI format; otherwise, it selects 0), a value of '01', '10' or '11' respectively indicating inclusion of HARQ-ACK bits for 1 DL DCI format, 2 DL DCI formats, and 3 DL DCI formats. Moreover, at least for TDD UL-DL configuration 0 including more UL TTIs than DL TTIs, an UL DCI format includes an UL index indicating

TABLE 2

| TDD UL-DL Configuration | TTI n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

To accommodate an additional HARQ latency for a TDD system, a respective maximum number of HARQ processes needs to be larger than for a FDD system. For DL operation and for TDD UL-DL configurations 2, 3, 4, and 5, a number of HARQ processes larger than 8 is needed (a number of HARQ processes of 10, 9, 12, and 15 is needed, respectively) and a respective DL HARQ process field in respective DCI formats includes 4 bits while it includes three bits for a FDD system where a maximum number of DL HARQ processes is eight.

DL DCI formats (in TDD) also include a DL Assignment Index (DAI) field of two bits. A DL DAI is a counter indicating a number for a DL DCI format a NodeB transmits to a UE in a DL TTI of a bundling window. The value of a DAI field is 1 if a respective DL DCI format is a first one a NodeB transmits to a UE, it is 2 if a DL DCI format is a second one a NodeB transmits to a UE, and so on. Using the value of a DL DAI field, a UE can determine whether it has whether a PUSCH scheduling applies for a first UL TTI, a second UL TTI, or both a first and a second UL TTIs.

In order to improve utilization of carriers with small BWs or facilitate communication over different carrier frequencies, a communication system may include an aggregation of several carriers. For example, one carrier may have a BW of 10 MHz while another carrier may have a DL BW of 1.4 MHz or one carrier may operate at a frequency of 900 MHz while another carrier may operate at a frequency of 3.5 GHz. Then, as a spectral efficiency of PDCCH transmissions is typically low in small DL BWs, it can be preferable to schedule a PDSCH in a carrier with DL BW of 1.4 MHz from a carrier with DL BW of 10 MHz (cross-carrier scheduling). Also, as a path-loss is larger for higher carrier frequencies and control information typically requires higher detection reliability than data information and cannot benefit from retransmissions, it can be preferable to schedule a PDSCH in a 3.5 GHz carrier from a 900 MHz carrier.

In Carrier Aggregation (CA), each carrier represents a cell. A UE can be configured by a NodeB through higher layer signaling more than one cell for PDSCH receptions (DL CA) or PUSCH transmissions (UL CA). For a UE configured with DL CA or UL CA, UE-common control information in a respective PDCCH is transmitted only in a DL of a single cell that is referred to as primary cell (PCell). Other cells are referred to as secondary cells (SCells). A UE always remains connected to its primary cell while a connection to a secondary cell may be activated or deactivated.

In CA, it is possible for a NodeB to schedule a UE in a second cell by transmitting PDCCH in a first cell. This functionality is referred to as cross-carrier scheduling and DCI formats include a Carrier Indicator Field (CIF) having a value corresponding to a respective cell. For example, for a CIF consisting of 3 bits and a UE configured with 5 cells, respective binary CIF values can be '000', '001', '010', '011', and '100' to indicate each of the 5 cells. In case of a UE configured with CA of 2 cells and with cross-carrier scheduling, all PDCCH are transmitted in the primary cell. CA between a FDD carrier and a TDD carrier allows for greater flexibility in utilizing TDD and FDD spectrum, improves load balancing without inter-mode hand-over and, for a backhaul connection with negligible delay, it avoids a UCI reporting latency associated with TDD operation.

Figure 8:
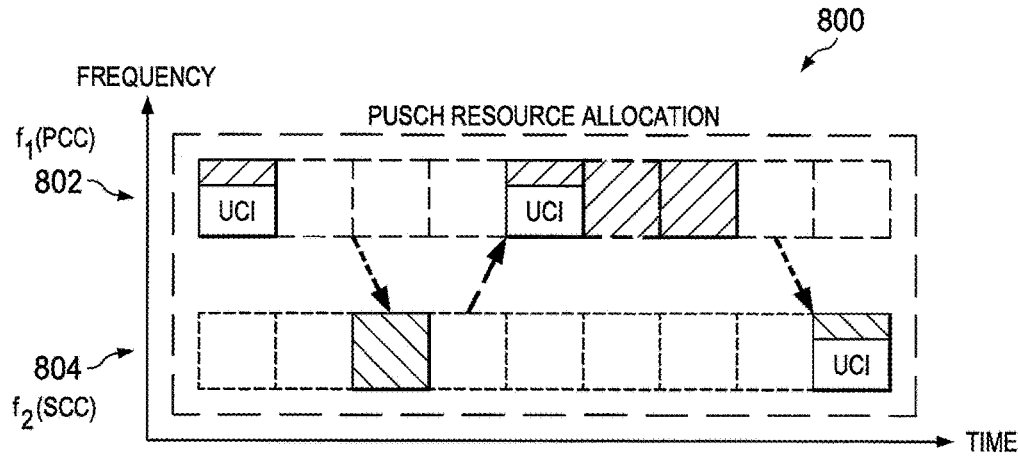
FIG. 8 illustrates an example of physical uplink shared channel (PUSCH) resource allocation according to this disclosure.

FIG. 8 illustrates an example of physical uplink shared channel (PUSCH) resource allocation according to this disclosure. One or more embodiments of this disclose recognize and take into account chart 800 illustrated in FIG. 8. UEs come in a wide variety of configurations, and FIG. 8 does not limit the scope of this disclosure to any particular implementation of a UE.

As shown in FIG. 8, a UE switches between a frequency 802 of a primary component carrier (PCC) and a frequency of a secondary component carrier (SCC) as time passes. In different embodiment, certain UE architectures may only be capable of transmitting on only one uplink carrier frequency at a time. For example, the UE may only be equipped with a single power amplifier for transmission or the UE may only be equipped with a single transmit RF circuit.

It should be noted that methods to enable uplink carrier frequency switching to support non-co-channel dual connectivity can also be applied to an uplink carrier selection scheme. In this embodiment, an eNodeB may be equipped with multiple uplink carriers, and methods are provided to enable the UE to switch its uplink carrier frequency depending on the channel or load condition for each carrier.

ABBREVIATIONS

ACK Acknowledgement
ARQ Automatic Repeat Request
CA Carrier Aggregation
C-RNTI Cell RNTI
CRS Common Reference Signal
CSI Channel State Information
D2D Device-to-Device
DCI Downlink Control Information
DL Downlink
DMRS Demodulation Reference Signal
EPDCCH Enhanced PDCCH
FDD Frequency Division Duplexing
HARQ Hybrid ARQ
IE Information Element
MCS Modulation and Coding Scheme
MBSFN Multimedia Broadcast multicast service Single Frequency Network
O&M Operation and Maintenance
PCell Primary Cell
PDCCH Physical Downlink Control Channel
PDSCH Physical Downlink Shared Channel
PMCH Physical Multicast Channel
PRB Physical Resource Block
PSS Primary Synchronization Signal
PUCCH Physical Uplink Control Channel
PUSCH Physical Uplink Shared Channel
QoS Quality of Service
RACH Random Access Channel
RNTI Radio Network Temporary Identifier
RRC Radio Resource Control
RS Reference Signals
RSRP Reference Signal Received Power
SCell Secondary Cell
SIB System Information Block
SSS Secondary Synchronization Signal
SR Scheduling Request
SRS Sounding RS
TA Timing Advance
TAG Timing Advance Group
TDD Time Division Duplexing
TPC Transmit Power Control
UCI Uplink Control Information
UE User Equipment
UL Uplink
UL-SCH UL Shared Channel Aspects, features, and advantages of the one or more embodiments of this disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The application is illustrated by way of example, and not by way of limitation, in the figures of the accompanying drawings.

One or more embodiments provides for uplink carrier switching. In an example embodiment, a UE is capable of downlink carrier aggregation or dual connectivity such that the UE can receive downlink transmissions on multiple carrier frequencies simultaneously and only capable of transmitting on one uplink carrier frequency at a time.

In one situation, at any given time, the UE is only capable of transmitting on one uplink frequency corresponding to a single uplink carrier.

In another situation, at any given time, the UE is only capable of transmitting on one uplink frequency band which may comprise of transmission on multiple uplink carriers.

One or more of the embodiments are described in the context of the first situation, but it should be understood that embodiments of the disclosure can also be applied in a straightforward manner to the second situation.

When the UE capable of transmitting on only uplink carrier frequency is configured with downlink carrier aggregation or dual connectivity, the UE can also be configured with the system information of multiple uplink carrier frequencies. In addition, the UE is also configured with UE-specific configurations per uplink carrier. For example, for each uplink carrier, the UE is configured with the corresponding uplink carrier frequency, uplink bandwidth, uplink cyclic prefix length, uplink power control configuration, random access resource configuration, SRS configuration, CSI feedback configuration, and the like, for example, via RRC signaling.

If the UE is only capable of transmitting at one uplink carrier frequency at a time, one or more embodiments may provide a method to control the UE's uplink carrier frequency. Time may be needed for the UE to switch uplink radio frequency during which the UE does not transmit signals, e.g. 0.5 ms may be needed to switch from one carrier frequency to another. The switching time incurs spectral efficiency loss, hence it may be considered desirable to minimize the switching frequency. Depending on UE implementation, the time needed for frequency switching can also be in the order of microseconds, in which case the switching time can be considered to be practically zero and no spectral efficiency loss is incurred.

Figure 9:
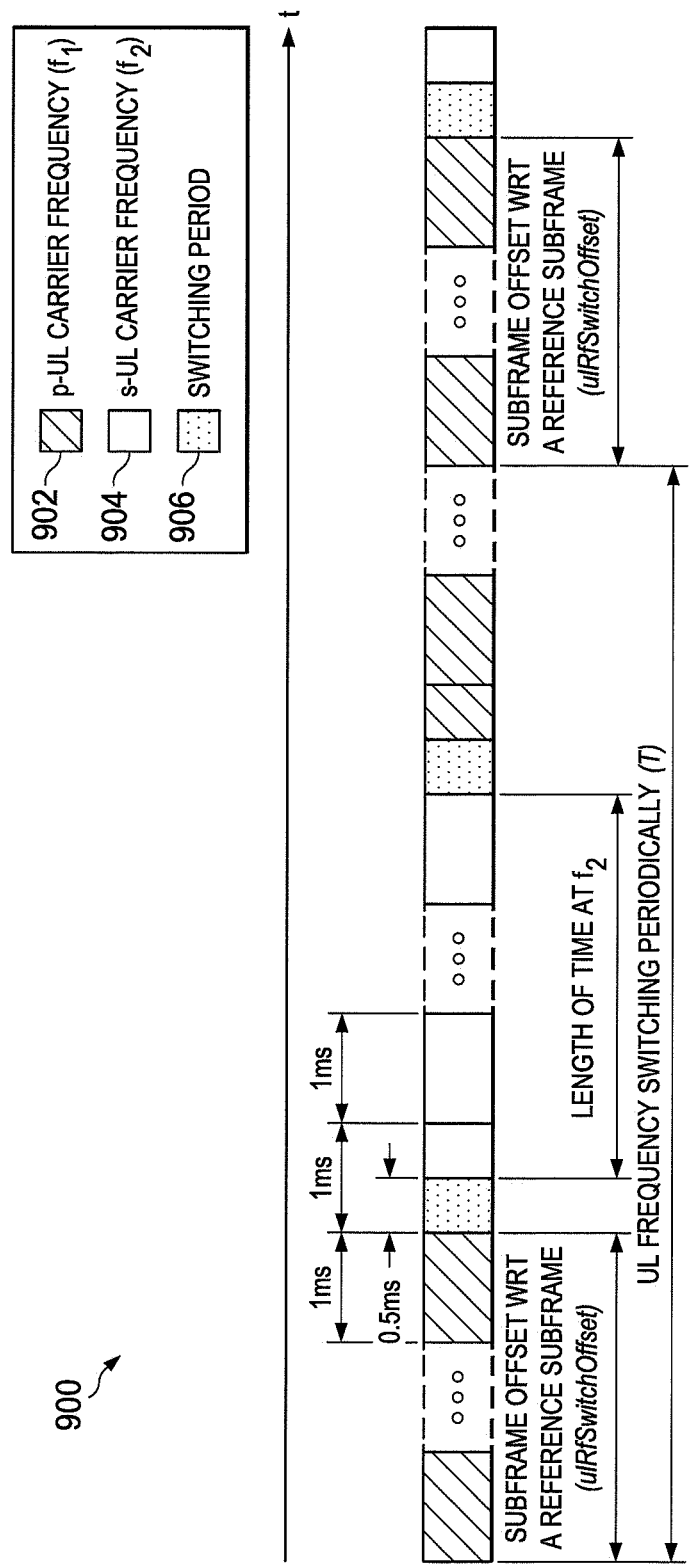
FIG. 9 illustrates an example uplink carrier frequency switching pattern according to this disclosure.

FIG. 9 illustrates an example uplink carrier frequency switching pattern 900 according to this disclosure. The embodiment of the pattern 900 illustrated in FIG. 9 is for illustration only, and the UEs 111-115 of FIG. 1 could have the same or similar configuration. However, UEs come in a wide variety of configurations, and FIG. 9 does not limit the scope of this disclosure to any particular implementation of a UE.

As shown in FIG. 9, the pattern 900 includes a primary uplink (p-UL) carrier frequency ($f_1$) 902, a secondary uplink (s-UL) carrier frequency ($f_2$) 904, and a switching period 906. In one embodiment, the UE can be configured with the pattern 900 and the UE could retune its uplink carrier frequency in accordance with the pattern 900.

For example, the UE may tune its carrier frequency to frequency $f_1$ 902 initially and switch its uplink carrier frequency to frequency $f_2$ 904 in a periodic manner at specified start times and stay at frequency $f_2$ 904 for a specified time period before switching back to frequency $f_1$ 902.

The initial carrier frequency can be the default uplink carrier frequency prior to the configuration of the carrier aggregation (e.g. uplink carrier frequency of the primary component carrier or a component carrier of a Master eNodeB (MeNB)) or can be configurable by the network as part of the carrier aggregation configuration, e.g. the uplink carrier frequency of the eNodeB controlling a secondary component carrier or a component carrier of a Secondary eNodeB (SeNB) can also be the initial uplink carrier frequency. The initial uplink carrier frequency may be referred to as the p-UL carrier frequency and the carrier frequency that the UE switches to periodically as the s-UL carrier frequency.

Although the disclosure is described using two carrier frequencies, it is only exemplary and the disclosure can be extended to three or more carrier frequencies in a straightforward manner.

The uplink carrier frequency switching start times can be defined by the system frame number (SFN) as well as the subframe offset with respect to the first subframe of the system frame. In one example, the switching to s-UL carrier frequency starts at a SFN and subframe that meet the following condition:

SFN mod T=FLOOR(ulRfSwitchOffset/10);

subframe=ulRfSwitchOffset mod 10;

where ulRfSwitchOffset and T are configurable by the network. In an example, ulRfSwitchOffset can be [0 . . . 39] and T can be "4". This enables the UE to switch from p-UL carrier frequency to s-UL carrier frequency once every four frames. Other example configurations are shown in Table 3. In one approach of uplink carrier frequency switching patterns configuration, a table such as Table 3 can be predefined, where each Configuration ID defines the periodicity T and the range of ulRfSwitchOffset; and the network can signal or reconfigure the Configuration ID as well as ulRfSwitchOffset to the UE by higher layer signaling (RRC or MAC) or by dynamic control signaling (using PDCCH/EPDCCH).

TABLE 3

Uplink carrier frequency switch start time configuration

| Configuration ID | ulRfSwitchOffset | T |
|---|---|---|
| 1 | [0 . . . 39] | 4 |
| 2 | [0 . . . 79] | 8 |
| 3 | [0 . . . 159] | 16 |

Upon switching to s-UL carrier frequency, the UE maintains its uplink frequency for a period of Y ms (including the switching period) where Y can be predefined in the 3GPP standards, e.g. 10 ms or 20 ms. After Y ms, the UE switches its uplink frequency back to p-UL carrier frequency. In one example, Y can be configurable by the network via higher layer signaling (e.g. RRC). To provide enhanced flexibility, Y can also be configured via MAC or dynamic control signaling (using PDCCH/EPDCCH).

TABLE 4

Time period during which the UE maintains its uplink carrier frequency at s-UL carrier frequency

| Configuration # | Time period at s-UL carrier frequency |
|---|---|
| 1 (or A) | 10 ms |
| 2 (or B) | 20 ms |
| 3 (or C) | 40 ms |

In another configuration method, the start time and Y can be jointly configured by the network using Configuration ID and ulRfSwitchOffset as shown in Table 5. The network can signal/reconfigure the Configuration ID as well as ulRfSwitchOffset to the UE by higher layer signaling (RRC or MAC) or by dynamic control signaling (using PDCCH/EPDCCH).

TABLE 5

Joint configuration of uplink carrier frequency switching start time and stay time

| Configuration ID | ulRfSwitchOffset | T (ms) | Time period at s-UL carrier frequency (ms) |
|---|---|---|---|
| 1 | [0 . . . 39] | 40 | 10 |
| 2 | [0 . . . 79] | 80 | 20 |
| 3 | [0 . . . 159] | 160 | 40 |

Figure 10:
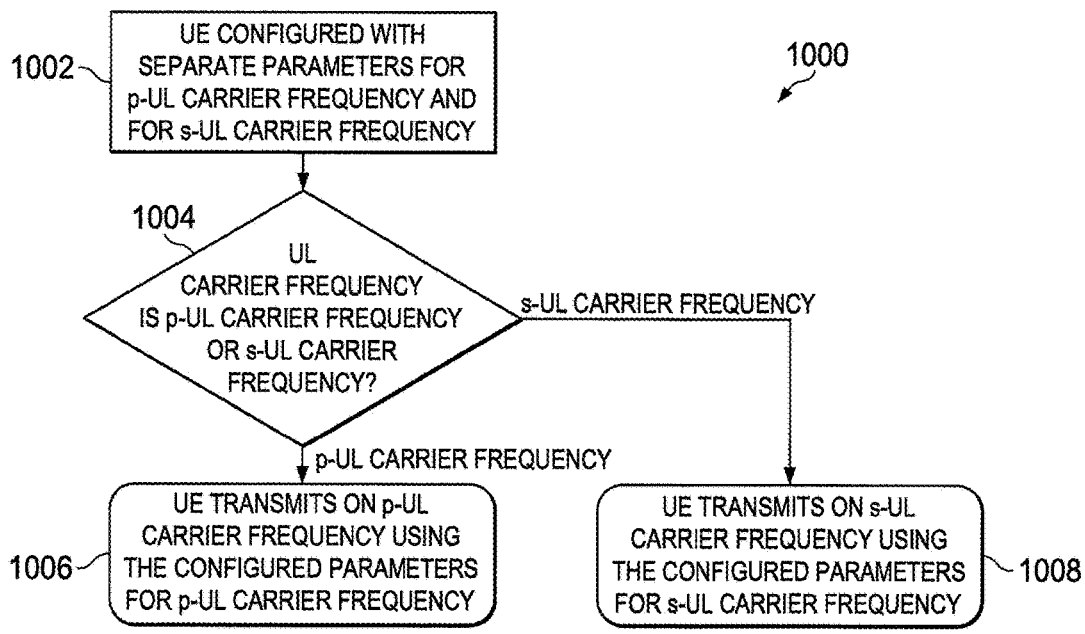
FIG. 10 illustrates an example process for determining which uplink carrier frequency for transmission according to this disclosure.

FIG. 10 illustrates an example process 1000 for determining which uplink carrier frequency for transmission according to this disclosure. The UE here may represent the UE 116 in FIGS. 1 and 3. The embodiment of the process 1000 shown in FIG. 10 is for illustration only. Other embodiments of the process 1000 could be used without departing from the scope of this disclosure.

At operation 1002, the UE can be configured with independent parameters relevant to uplink transmission per uplink carrier frequency. At operation 1004, the UE identifies whether the UL carrier frequency is the p-UL carrier frequency or the s-UL carrier frequency.

At operation 1006, when the UE's uplink carrier frequency is tuned to p-UL carrier frequency, the UE shall transmit uplink signals according to the configurations for p-UL carrier frequency. At operation 1008, when the UE's uplink carrier frequency is tuned to s-UL carrier frequency, the UE shall transmit uplink signals according to the configurations for s-UL carrier frequency. The configurations relevant to uplink transmission includes SRS, periodic CSI reporting, PUCCH (if defined/configured for the carrier), random access resource configuration, uplink power control configuration, and the like.

Figure 11:
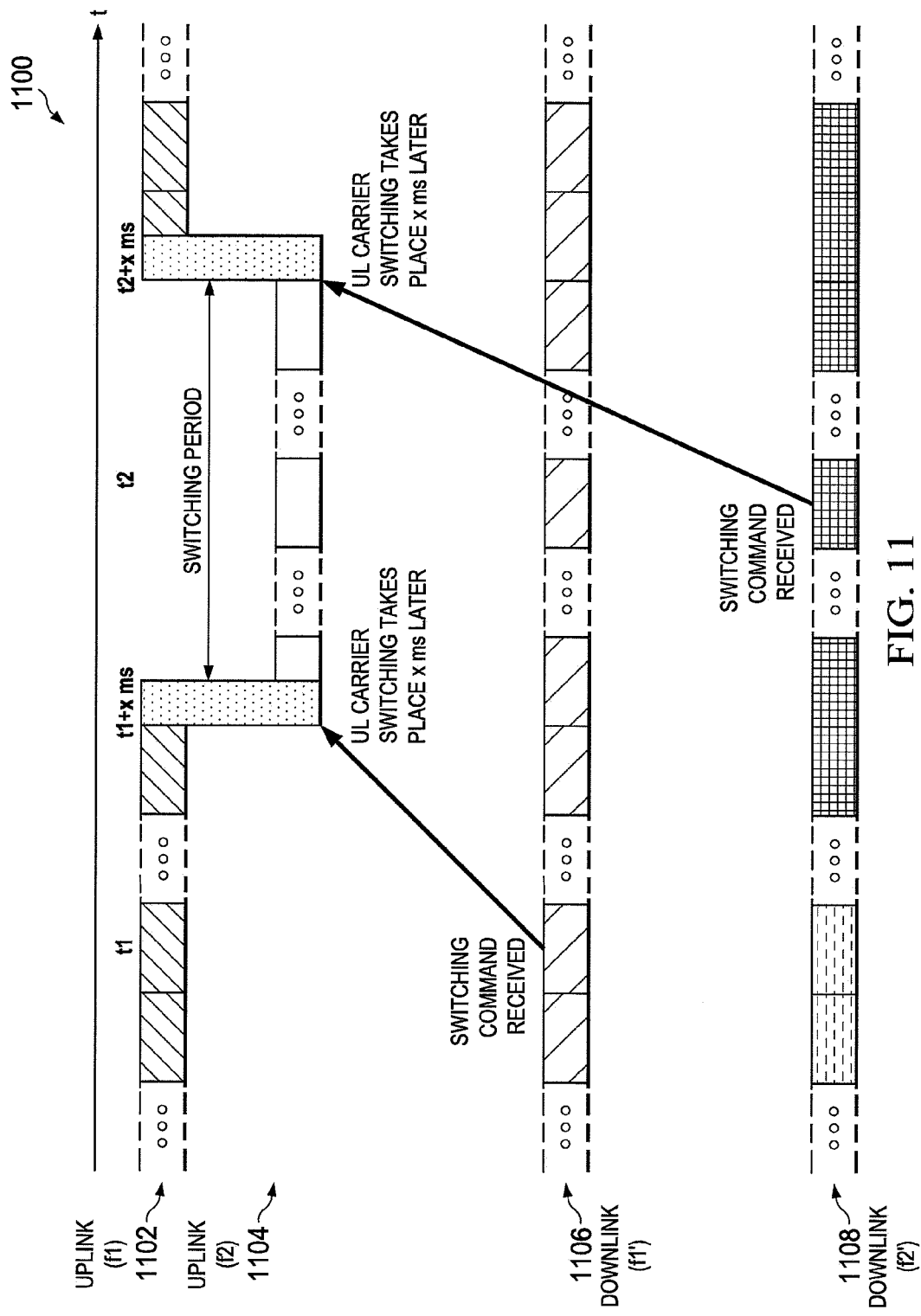
FIG. 11 illustrates an example uplink carrier frequency switching pattern according to this disclosure.

FIG. 11 illustrates an example uplink carrier frequency switching pattern 1100 according to this disclosure. The embodiment of the pattern 1100 illustrated in FIG. 11 is for illustration only, and the UEs 111-115 of FIG. 1 could have the same or similar configuration. However, UEs come in a wide variety of configurations, and FIG. 11 does not limit the scope of this disclosure to any particular implementation of a UE.

As shown in FIG. 11, the pattern 1100 includes an uplink frequency ($f_1$) 1102, an uplink frequency ($f_2$) 1104, a downlink frequency ($f_1'$) 1106, and a downlink frequency ($f_2'$) 1108. In one embodiment, the UE can be configured with the pattern 1100 and the UE could retune its uplink carrier frequency in accordance with the pattern 1100.

In one or more embodiments, the UE switches uplink carrier frequency upon receiving a command from the network. For example, the UE may tune its carrier frequency to frequency $f_1$ 1102 initially and switch its uplink carrier frequency to frequency $f_2$ 1104 if signaled by the network to do so.

The UE can be configured by higher layer signaling with the system information and parameters associated with each potential target uplink carrier frequency, including an identity for each of the uplink carrier frequency. Then, the command for uplink carrier frequency switching includes the target uplink carrier frequency identity. The number of signaling bits can be defined by the number of target uplink carrier frequencies, e.g. when there are only two possible uplink carrier frequencies, only a single bit signaling may be used. The small signaling overhead makes it suitable to be delivered in a physical downlink control channel such as PDCCH or EPDCCH. Nevertheless, deliveries of the switching command by MAC control element or RRC are also viable options.

Assuming control signaling by PDCCH/EPDCCH, a new DCI format can be defined to carry the switching command. The DCI can be UE-specific; i.e. it can be sent in the UE-specific search space of the PDCCH/EPDCCH and the CRC of the PDCCH/EPDCCH can be scrambled with UE's C-RNTI or UE ID. One bit can be introduced in the DCI format (DCI formats for downlink assignment (e.g. DCI format 2, 2A, 2B, 2C, 2D) or DCI formats for UL grant (e.g. DCI format 0, 4)) to indicate the switching command. Bit value of 0 can mean "don't switch" and bit value of 1 can mean "switch". In another embodiment, the DCI can also be common for a group of UEs and the DCI can be sent in the common search space of the PDCCH/EPDCCH. A new RNTI can also be defined to scramble the CRC of the PDCCH/EPDCCH. If the new DCI format has a different size than the other existing DCI formats that the UE has to monitor, there is a cost of additional blind decoding to the UE. To overcome this overhead, the DCI can be padded with bits such that the final size is the same as that of one of the existing DCI formats. In another option, the DCI format can reuse the data structure of one of the existing DCI formats, except that certain bit fields can be fixed to certain values commonly known to both the network and the UE (which can serve as additional protection against false detection).

In carrier aggregation, there is a downlink carrier that is linked to each uplink carrier, either by SIB-2 or by RRC signaling. In one option, the UE may only be required to monitor the switching command on the downlink carrier that is linked to the current uplink carrier. This is consistent with the PDCCH/EPDCCH monitoring behavior described below.

Regardless of the signaling method (RRC, MAC or PDCCH/EPDCCH), time is needed for the UE to decode and apply the new configuration. In one embodiment, the UE can immediately apply the new configuration upon successfully decoding the (re)configuration message. A maximum delay to apply the new configuration can also be defined. An advantage of this behavior is reduced latency. However, the exact timing of uplink carrier switching of the UE may be unknown to the network since not all UEs have exactly the same implementation. It may be desirable to avoid this ambiguity even though it is a temporary one especially if this affects other UE behavior such as the downlink PDCCH/EPDCCH monitoring behavior as described below. To avoid potential ambiguity, exact timing of switching can be defined.

In one example embodiment, the UE applies new configuration after x ms of receiving the command, e.g. x ms can be 4 ms or other value that is sufficiently large for the UE to process and apply the control signaling.

In another example embodiment, the UE applies the new configuration after x ms of transmitting positive HARQ-ACK to acknowledge successful reception of the switching command. The x value may take into account network internal processing delay if inter-eNodeB coordination is involved.

To allow for different deployment scenarios (e.g. to accommodate different backhaul type), the delay x can be made configurable by the network.

Figure 12:
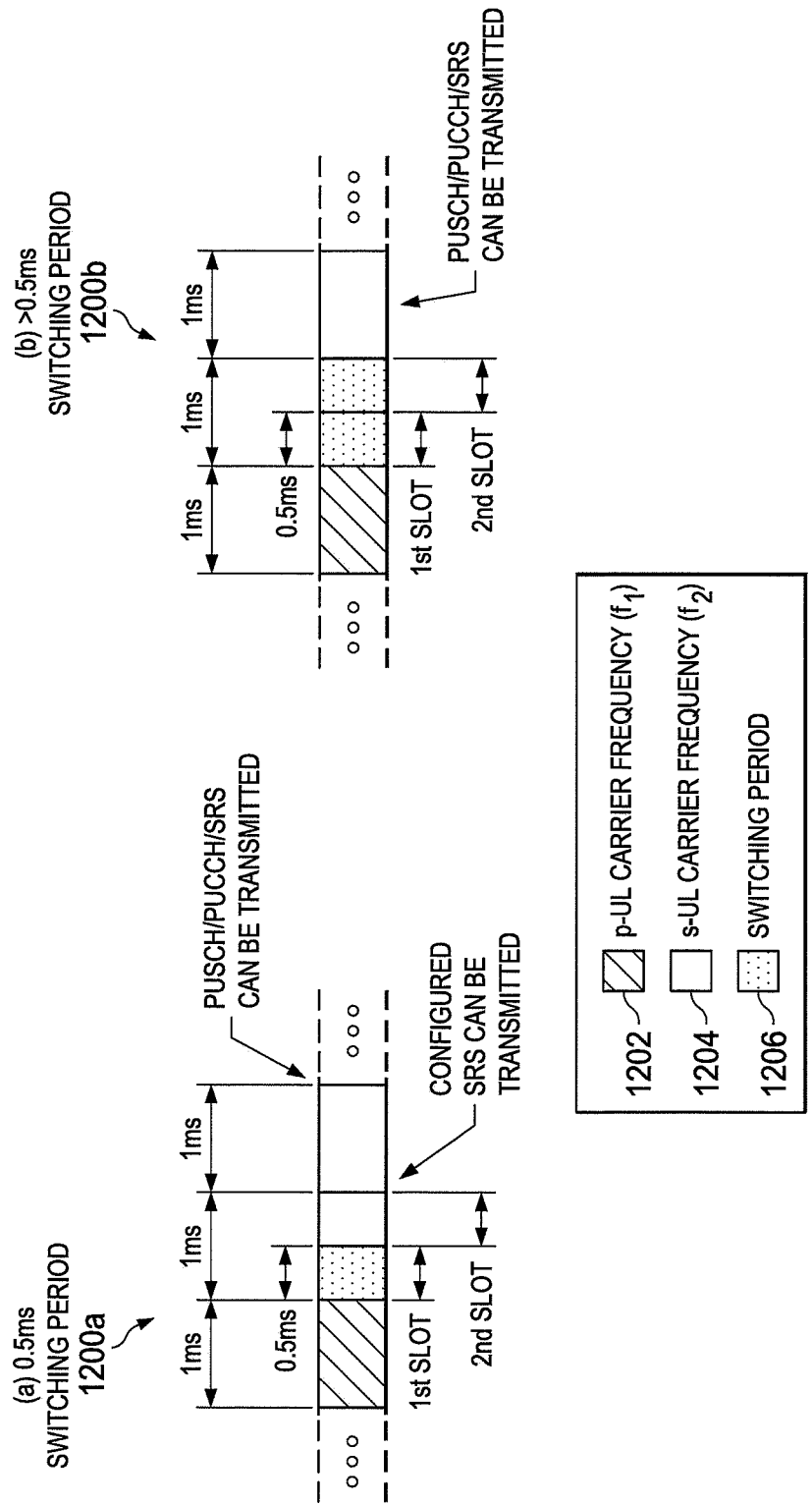
FIG. 12 illustrates an example of configurable switching period patterns according to this disclosure.

FIG. 12 illustrates an example of configurable switching period patterns 1200a-b according to this disclosure. The embodiment of the patterns 1200a-b illustrated in FIG. 12 is for illustration only, and the UEs 111-115 of FIG. 1 could have the same or similar configuration. However, UEs come in a wide variety of configurations, and FIG. 12 does not limit the scope of this disclosure to any particular implementation of a UE.

As shown in FIG. 12, the patterns 1200a-b include a primary uplink (p-UL) carrier frequency ($f_1$) 1202, a secondary uplink (s-UL) carrier frequency ($f_2$) 1204, and a switching period 1206. In one embodiment, the UE can be configured with one of the patterns 1200a-b and the UE could retune its uplink carrier frequency in accordance with the pattern 1200a or 1200b.

In an embodiment, when using pattern 1200a, the switching period 1206 may be 0.5 ms and, when using pattern 1200b, the switching period 1206 may be 1.0 ms. In other embodiments of this disclosure, the switching period 1206 may be other time periods.

In an embodiment, time may be provisioned for the UE to carry out uplink carrier frequency switching, e.g. 0.5 ms or 1 ms. During the switching period 1206, the UE does not transmit uplink signals. In one example, if the UE switches uplink frequency at the beginning of the first slot of subframe x, the UE may start to transmit at the new frequency at the beginning of the first slot of subframe x+1. In another example, the UE may start to transmit certain physical signals at the beginning of the second slot of subframe x, e.g. the SRS, at the new frequency, but the other physical signals may only be transmitted from subframe x+1.

One or more embodiments provides for uplink timing alignment. If the time away from a carrier frequency is longer than a specified time, the UE may be required to initiate random access procedure by transmitting physical random access channel to acquire uplink synchronization after switching to the carrier frequency. The UE may only be allowed to transmit other physical signals such as PUCCH/PUSCH/SRS after successful acquisition of uplink synchronization. In LTE Rel-11, there can be one Time Alignment Timer (TAT) per Timing Advance Group (TAG). The TAT for the primary TAG is called pTAG and the TAT for a secondary TAG is called sTAG. Upon the expiry of the TAT for a TAG, the UE assumes that the carriers corresponding to the TAG is no longer uplink synchronized and stops uplink transmission. Upon the expiry of the pTAG, the UE shall assume that all carriers (including carriers corresponding to sTAGs) are no longer uplink synchronized. The UE may only be allowed to transmit physical random access channel on a carrier of a sTAG if initiated by the network.

When the UE is configured with uplink carrier frequency switching pattern as described in any of the patterns above, one or more embodiments may maintain uplink synchronization with carriers corresponding to p-UL carrier frequency and s-UL carrier frequency. The carriers corresponding to p-UL carrier frequency and s-UL carrier frequency may be configured to be in different TAGs with separate TATs. The TAT for a carrier may continue to run even if the UE does not have its uplink frequency tuned to the carrier frequency.

Upon switching uplink carrier frequency, the UE checks if the TAT for the target uplink is still running. If the TAT is not running, the UE shall initiate random access procedure to acquire uplink synchronization even if the carrier corresponds to a secondary component carrier, instead of waiting for network to initiate the random access procedure. This reduces time delay to acquire uplink synchronization. For faster acquisition, the random access resource (preamble and time/frequency resource) can be configured per uplink carrier to the UE.

In one embodiment, when the UE is configured with dual connectivity, upon the expiry of the pTAG's TAT, the UE may not assume that the TAT(s) of all other carriers corresponding to another eNodeB also expire(s).

Figure 13A:
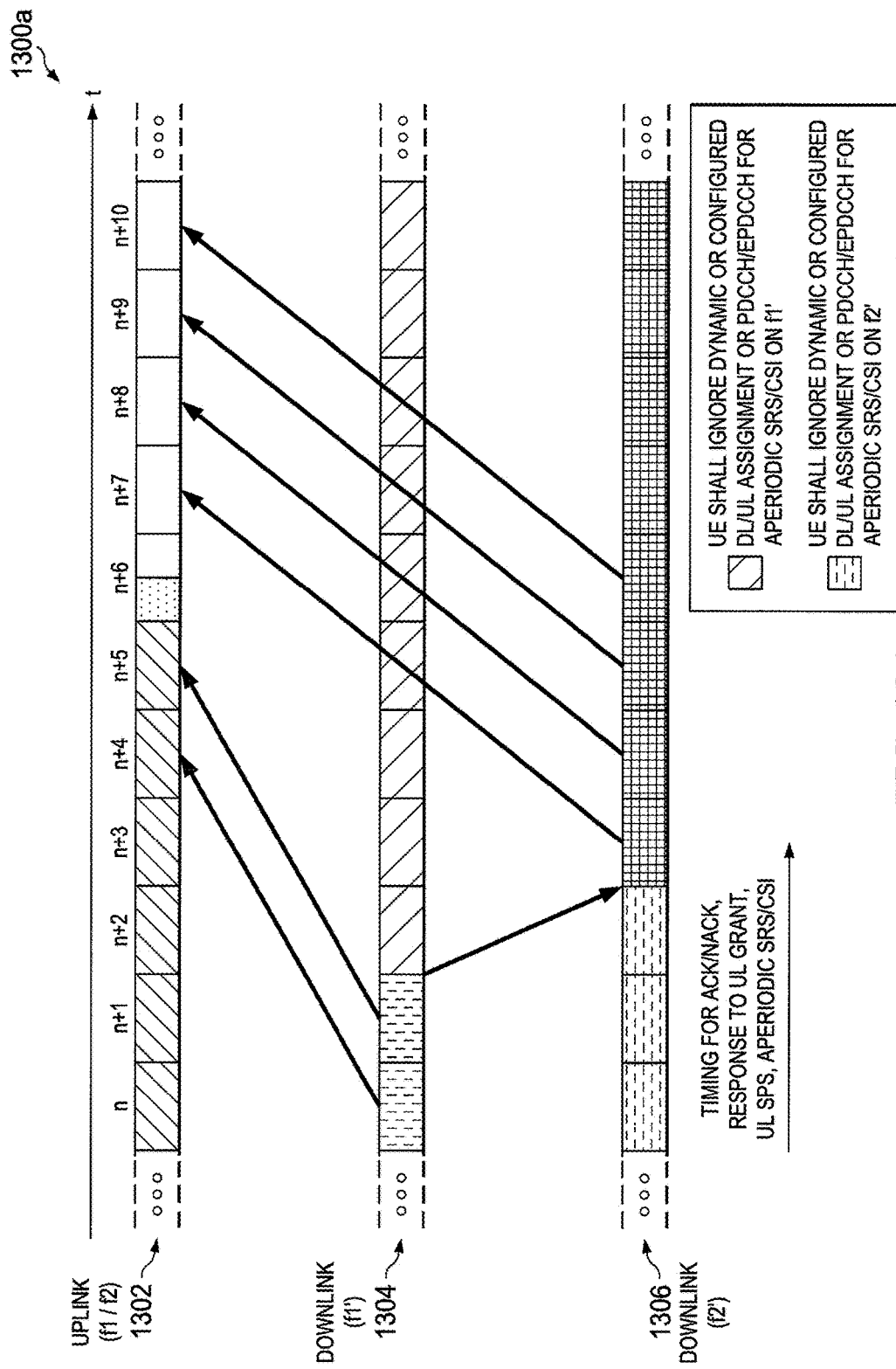
FIGS. 13A-13B illustrate example of PDCCH/EPDCCH monitoring behaviors according to this disclosure.
Figure 13B:
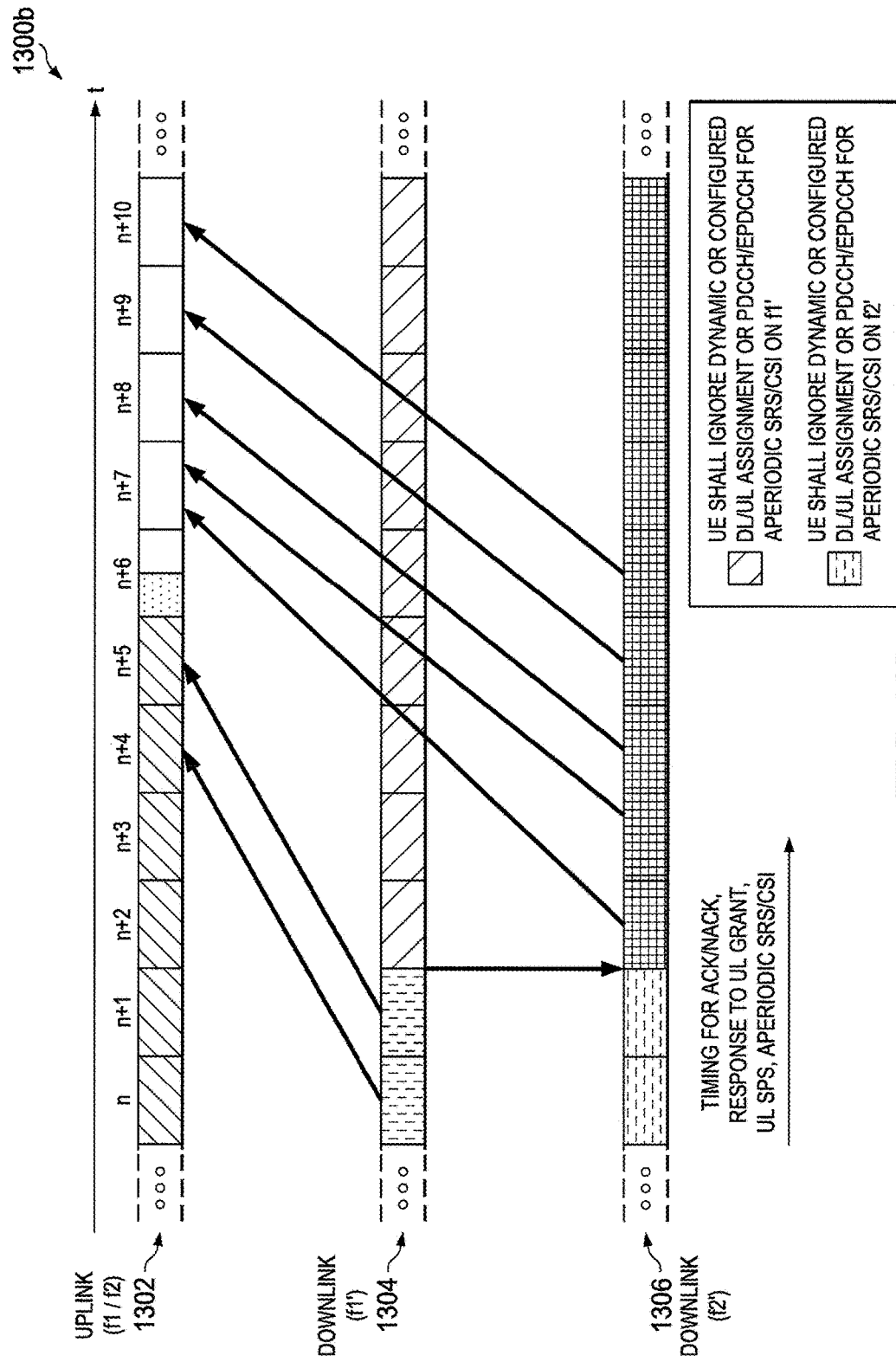

FIGS. 13A-13B illustrate example of PDCCH/EPDCCH monitoring behaviors according to this disclosure. The embodiment of the monitoring behaviors illustrated in FIGS. 13A-13B are for illustration only, and the UEs 111-115 of FIG. 1 could have the same or similar behaviors. However, UEs come in a wide variety of configurations, and FIGS. 13A-13B do not limit the scope of this disclosure to any particular implementation of a UE.

As shown in FIGS. 13A-13B, the pattern 1300 includes uplink frequencies ($f_1/f_2$) 1302, a downlink frequency ($f_1'$) 1304, and a downlink frequency ($f_2'$) 1306. In one embodiment, the UE can be configured with the pattern 1300a or 1300b and the UE could retune its uplink carrier frequency in accordance with the pattern 1300a or 1300b.

In one or more embodiments, the UE may ignore dynamic or configured unicast downlink assignment, dynamic or configured uplink assignment, and an aperiodic CSI/SRS request received on a DL carrier that would result in transmission of HARQ-ACK, PUCCH/PUSCH on the uplink carrier linked (e.g. via SIB2) to the DL carrier at the time when the UE does not have its uplink frequency tuned to the uplink carrier concerned. Dynamic downlink/uplink assignment refers to downlink/uplink assignment with a corresponding PDCCH/EPDCCH (with CRC scrambled by C-RNTI or UE ID) and configured downlink/uplink assignment refers to downlink/uplink assignment without a corresponding PDCCH/EPDCCH (semi-persistent scheduling (SPS), CRC of the activation PDCCH/EPDCCH is scrambled with SPS-RNTI).

Equivalently, if the UE is configured switch carrier frequency from $f_1$ to $f_2$ at the beginning of subframe k, the UE could monitor PDCCH/EPDCCH on $f_1$ for dynamic or configured unicast downlink assignment, dynamic or configured uplink assignment, aperiodic CSI/SRS request until and including subframe k−m−1. The UE may not need to monitor PDCCH/EPDCCH on $f_1$ for dynamic or configured unicast downlink assignment, dynamic or configured uplink assignment, aperiodic CSI/SRS request from subframe k−m until m subframes before the next switching subframe. Meanwhile, the UE may monitor PDCCH/EPDCCH on $f_2$ for dynamic or configured unicast downlink assignment, dynamic or configured uplink assignment, aperiodic CSI/SRS request from subframe k−m until m subframes before the next switching subframe. One example of this principle is illustrated in FIG. 13A where m is assumed to be four subframes. In this example, if the uplink carrier switching occurs at subframe n+6 from frequency $f_1$ to f2, the UE stops monitoring the PDCCH/EPDCCH on the downlink carrier that is linked to $f_1$ (i.e. $f_1'$) from subframe n+2, and starts monitoring the PDCCH/EPDCCH on the downlink carrier that is linked to $f_2$ (i.e. $f_2'$) from subframe n+3 (inclusive). Another example is illustrated in FIG. 13B where the UE starts monitoring downlink carrier $f_2'$ from subframe n+2 rather than n+3 to avoid wasting downlink resources. In this embodiment, the UE shall report HARQ-ACK to any downlink assignment detected in subframe n+2 in subframe n+7.

One or more embodiments provide semi-persistent scheduling (SPS). Upon UL SPS activation, the UE is required to transmit periodically on the target UL carrier frequency until the SPS session is deactivated. The SPS transmission interval is configurable by the network, e.g. 10, 20, 32, 40, 64, 80, 128, 160, 320, 640 ms.

In one embodiment, in order to minimize the uplink carrier switching frequency, the UE shall remain tuned to the target uplink carrier frequency until the SPS is deactivated. The UE can then resume the uplink carrier frequency switching behavior as described in FIG. 9.

In another embodiment, the UE shall remain tuned to the target uplink carrier frequency until the SPS is deactivated if the SPS transmission interval configured is less than or equal to a certain value. For example, the value can be 20 ms or 40 ms.

When there is inter-eNodeB carrier aggregation, the SPS configuration of the UE could be exchanged between eNodeBs, including the SPS transmission interval and the timing of SPS activation/deactivation. This enables the eNodeBs to be in-sync about UE's UL carrier switching status.

One or more embodiments provide joint operation of an FDD carrier and a TDD carrier with non-ideal backhaul.

Several additional aspects exist for supporting joint operation or CA between an FDD cell and a TDD cell with non-ideal backhaul connection (characterized by one-way latency of more than 10 s of ms) between them, regardless of whether the FDD cell or the TDD cell is the primary cell. PUCCH transmission in a secondary cell can generally be an option for UEs configured with aggregation of multiple cells, which can be particularly beneficial in CA between cells connected with a non-ideal backhaul. In this disclosure, we focus on the case where the UE is not capable of simultaneous UL transmission or not capable of UL carrier aggregation.

One aspect is a determination of an UL TTI for transmission in the FDD cell of HARQ-ACK information in response to transmissions of DL DCI formats for the FDD cell. Another aspect is a determination for an existence and dimensioning of various fields in DCI formats for the MD cell, including a DL HARQ process index field, a DL DAI field, and an UL DAI field.

One or more embodiments recognizes and takes into account that there is a need to determine an UL TTI for transmission in the FDD cell of HARQ-ACK information in response to transmissions of DL DCI formats for the FDD cell.

One or more embodiments recognizes and takes into account that there is another need to determine an existence and dimensioning of various fields in DCI formats for an FDD secondary cell, including a DL HARQ process index field, a DL DAI field, and an UL DAI field.

In one or more of the following embodiments, it may be assumed that UCI for a carrier is transmitted by a UE over the air to an eNodeB associated with the carrier, either via PUCCH (either on the primary cell or on a secondary cell) or via PUSCH (either on the primary cell or on a secondary cell). While non-negligible backhaul latency between cells of e.g. more than 10s of ms (one-way) is considered in the exemplary deployment scenarios, it is not a necessary condition for the embodiments that can also apply to deployment scenarios with ideal backhaul between cells.

One or more of the following embodiments consider a UE that is not capable of UL carrier aggregation but is capable of DL carrier aggregation; i.e. a UE that is not capable of simultaneous transmissions on multiple UL carriers but is capable of simultaneous receptions on multiple DL carriers. However, a UE may be capable of switching its UL carrier frequency from one frequency to another in a fraction of a millisecond.

One or more of the following embodiments consider as an exemplary realization a single FDD cell (primary cell) and a single TDD cell (secondary cell); extensions to multiple FDD cells (with one FDD primary cell) or multiple TDD secondary cells are straightforward and are omitted for reasons of brevity and simplicity.

A UE without UL CA capability may not be able to transmit simultaneously in different carrier frequencies. If the UE is configured with DL carrier aggregation of a FDD cell (Primary cell) and a TDD cell (secondary cell) and there is non-ideal backhaul connection between the two cells, both the FDD cell and the TDD cell require uplink transmission from the UE (in a different UL carrier for each cell) to deliver UL control information and UL data for the respective cell. This implies that a UE without UL CA capability may switch its UL carrier frequency between the two cells. One or more embodiments of this disclosure provide an UL frequency switching behavior between cells for a UE so that a network and the UE have a same understanding on when the UE can transmit on an UL frequency.

FIGS. 14A-14B illustrate example of PUSCH in subframes 1400a-b according to this disclosure. The embodiment of the monitoring behaviors illustrated in FIGS. 14A-14B are for illustration only, and the UEs 111-115 of FIG. 1 could have the same or similar behaviors. However, UEs come in a wide variety of configurations, and FIGS. 14A-14B do not limit the scope of this disclosure to any particular implementation of a UE.

As shown in FIGS. 14A-14B, the subframes 1400 include slots 1402, symbols 1404, reference signals 1406, resource elements 1408, and uplink switching time periods 1410. In one embodiment, the UE can be configured with the subframes 1400a or 1400b and the UE could retune its uplink carrier frequency in accordance with the subframes 1400a or 1400b.

In an embodiment, in a UE hardware implementation, the UL frequency switching takes a fraction of a millisecond. Depending on how efficient the UE implementation is, the UL frequency switching duration may be as short as less than an OFDM symbol duration (i.e., less than 0.5/7 ms), or as long as about a time slot (i.e., 0.5 ms). When designing a protocol, a typical UE hardware implementation efficiency should be taken into account.

As long as the UL frequency switching duration is longer than the CP length, the UL frequency switching could be explicitly considered in the protocol. A subframe in which a UE applies UL frequency switching from a TDD carrier to a FDD carrier (D->D/S->D/U for FDD) is referred to as $S_{TF}$ subframe (e.g. subframe 1400b); and a subframe in which a UE applies UL frequency switching from a FDD carrier to a TDD carrier (D/U->D/S->D for FDD) is referred to as $S_{FT}$ subframe (e.g. subframe 1400a). It is noted that the UL frequency switching duration can be the same, regardless of whether the switching is from FDD to TDD or from TDD to FDD.

In one example, the protocol allows UL frequency switching duration no longer than 0.5 ms. Then, the first slot (0.5 ms) of the $S_{FT}$ subframe (assuming switching begins at the beginning of the second slot of the D/S subframe) and the second slot (0.5 ms) of the $S_{TF}$ subframe (assuming switching begins at the beginning of the D/S subframe) can be available for UL transmission in the FDD carrier. While PUCCH/PUSCH may not be able to be transmitted using only one slot (half subframe), SRS can still be transmitted in the last SC-FDM symbol of the subframe in the $S_{TF}$ subframe. Alternatively, PUCCH/PUSCH can also be transmitted only in one slot (the first slot for the $S_{FT}$ subframe and the second slot for the $S_{TF}$ subframe or, in general, in a number of subframe symbols available for UL transmission), possibly while also increasing, for example doubling, a transmission power in order to offset some of the performance loss that occurs from not transmitting in the first slot. A Transport Block Size (TBS) indicated in DCI formats for UL grant for the one-slot PUSCH can also be scaled to account for the fact that the PUSCH transmission will be over a reduced number of transmission symbols. For example, assuming that half the transmission symbols are available in a slot compared to a subframe that includes two slots, the TBS indicated by a respective DCI format can be scaled by a factor of 0.5. For example, if $N_{symb,max}^{PUSCH}$ is a maximum number of transmission symbols for data in a subframe and $N_{symb,reduced}^{PUSCH}$ is a number of transmission symbols for data after switching the UL carrier frequency, a TBS signaled in a DCI format can be scaled by $N_{symb,reduced}^{PUSCH}/N_{symb,max}^{PUSCH}$ or by a fixed value such as 0.5 if the UL data transmission is approximately over one slot.

In another example, the protocol allows for two different UE implementations for two categories of UEs. One category of UEs can perform UL frequency switching within 0.5 ms, while the other category of UEs cannot perform UL frequency switching within 0.5 ms. In this case, for the UEs who can perform UL frequency switching within 0.5 ms can transmit SRS, while the other type of UEs cannot transmit SRS in the $S_{TF}$ subframe. In order to facilitate the network to differentiate these two types of UEs, a UE capability signaling can be introduced, so that the network can be aware of UE capability before deciding whether to schedule SRS transmission for the UE in respective $S_{TF}$ subframes.

If UL frequency switching can be performed within microseconds, i.e. within X SC-FDM symbols (e.g. one or two or three SC-FDM symbols), a majority of UL resource loss in D/S subframes can be recovered if PUCCH and/or PUSCH are also defined for D/S subframes for the remaining $N_{symb}^{PUSCH}$-X symbols.

In one example, the protocol allows UL frequency duration no longer than an SC-FDM symbol duration (i.e., less than 0.5/7 ms, X=1). During the $S_{ET}$ subframe as shown in FIG. 14A, the last SC-FDM symbol is used for UL frequency switching. During the $S_{TF}$ subframe as shown in FIG. 14B, the first SC-FDM symbol is used for UL frequency switching. In this case, ($N_{symb}^{PUSCH}$-1) SC-FDM symbols are available for UL transmissions. In another example, a UE is allowed to transmit PUSCH and/or PUCCH transmissions in each of $S_{TF}$ and $S_{FT}$ subframes as if cell-specific SRS is configured in the $S_{FT}$ subframe; however, the UE is not allowed to transmit SRS in the subframe. For $S_{TF}$ subframes, PUCCH format 2 can be transmitted with the first SC-FDM symbol considered punctured. PUCCH formats 1a/1b/3 can also be transmitted if shorter time-domain orthogonal covering code (OCC) (one symbol shorter) is used; however it would not be possible to multiplex conventional UEs with the UEs employing the shorter OCC. In another method for $S_{TF}$ subframes, a UE is allowed to transmit PUCCH format 2 (with the first SC-FDM symbol considered punctured), but PUCCH format 1a/1b/3 cannot be transmitted.

Figure 15:
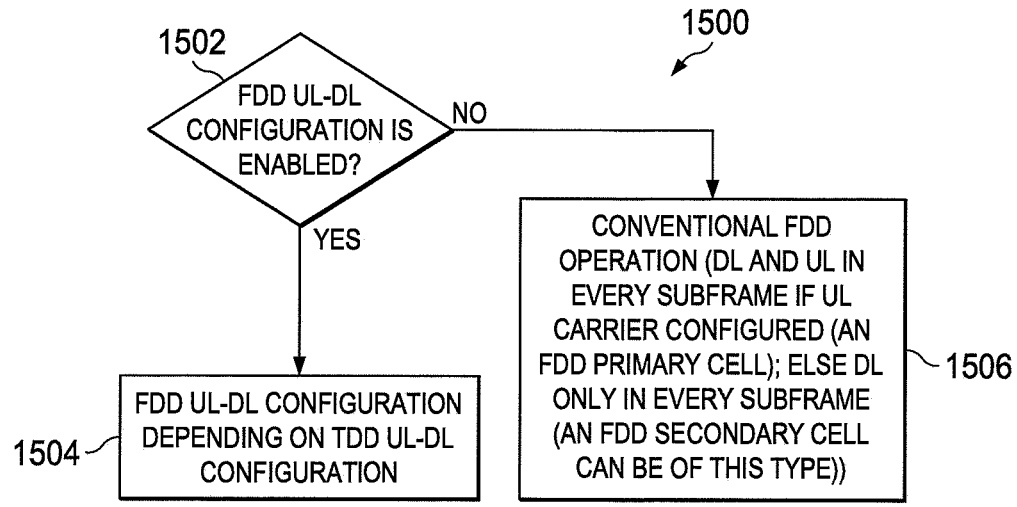
FIG. 15 illustrates an example process for determining an uplink TTI switching pattern for FDD and TDD joint operation according to this disclosure.

FIG. 15 illustrates an example process 1500 for determining an uplink TTI switching pattern for FDD and TDD joint operation according to this disclosure. The UE here may represent the UE 116 in FIGS. 1 and 3. The embodiment of the process 1500 shown in FIG. 15 is for illustration only. Other embodiments of the process 1500 could be used without departing from the scope of this disclosure.

In one or more embodiments, an UL frequency switching behavior is determined by the TDD UL-DL configuration of the TDD cell. For example, a UE tunes its UL frequency to the FDD cell by default and switches to the UL frequency of the TDD cell during a special subframe of the TDD cell in which the TDD cell switches from DL to UL; the UE switches its UL frequency to the FDD cell when the TDD cell switches from UL to DL. Table 6 shows the subframes within a frame that a UE identifies as DL and UL subframes for the FDD cell. As shown in Table 6, for every TDD UL-DL configuration, there is a corresponding FDD UL-DL configuration that determines a UE's interpretation of DL subframes (denoted as D), UL subframes (denoted as U) as well as subframes where the UE performs UL frequency switching (denoted as S, which can be $S_{TF}$ or $S_{ET}$ as in Embodiment 1). Referring again to Table 6, when a UE is configured with TDD UL-DL configuration 2 for the TDD cell, the FDD UL-DL configuration is implicitly determined by the UE to be Configuration 2. In the FDD cell, subframes 4, 5, and 9 are both DL and UL subframes (D/U), subframes 1, 3, 6, 8 are DL subframes and UL switching subframes (D/S) where a UE can receive in the DL and switches its UL frequency, and subframes 2 and 7 are DL only subframes (D).

Note that for the example in Table 6, TDD UL-DL configuration 0 does not have the corresponding FDD UL-DL configuration as there would be no UL subframes for the FDD cell. To enable a FDD UL-DL configuration for TDD UL-DL configuration 0, the DL/UL/S subframe pattern can be modified to enable at least one UL subframe for the FDD cell. For example, subframe 9 of the TDD cell to be changed from a U subframe to a switching subframe (denoted S' to differentiate from the special subframe S of TDD) and the modified TDD UL-DL configuration is referred to as TDD UL-DL configuration 0'. This allows subframe 9, 0, and 1 of the FDD cell to be D/S, D/U and D/S, respectively, so that there is at least one UL subframe available for FDD UL-DL configuration 0, as shown in Table 8. In another example, subframe 4 and 9 of the TDD cell to be changed from a U subframe to a switching subframe (again, denoted S' to differentiate from the special subframe S of TDD) and the modified TDD UL-DL configuration is referred to as TDD UL-DL configuration 0". This allows subframes {1,4,6,9} and {0,5} of the FDD cell to be D/S and D/U, respectively, so that there is at least one UL subframe available for FDD UL-DL configuration OA, as shown in Table 8. In yet another example, if PUCCH/PUSCH/SRS is defined on the D/S subframes as described above, TDD UL-DL configuration 0 can be the same as the legacy configuration, and subframes {0,1,5,6} can be defined as the D/S subframes for the FDD cell.

If the TDD UL-DL configuration is reconfigured, e.g. to adapt to dynamic traffic, the FDD UL-DL configuration is also reconfigured accordingly. Hereafter, a UE that performs the described UL frequency switching behavior is referred to as being configured or enabled with FDD UL-DL configuration.

TABLE 6

| | FDD UL-DL configuration | | | | | | | | | | |
|---|---|---|---|---|---|---|---|---|---|---|---|
| TDD UL-DL Configuration | FDD UL-DL configuration | TTI/subframe number | | | | | | | | | |
| | | 0 | 1 | 2 | 3 | 4 | 5 | 6 | 7 | 8 | 9 |
| 0 | N/A | — | — | — | — | — | — | — | — | — | — |
| 1 | 1 | D/U | D/S | D | D | D/S | D/U | D/S | D | D | D/S |
| 2 | 2 | D/U | D/S | D | D/S | D/U | D/U | D/S | D | D/S | D/U |
| 3 | 3 | D/U | D/S | D | D | D | D/S | D/U | D/U | D/U | D/U |
| 4 | 4 | D/U | D/S | D | D | D/S | D/U | D/U | D/U | D/U | D/U |
| 5 | 5 | D/U | D/S | D | D/S | D/U | D/U | D/U | D/U | D/U | D/U |
| 6 | 6 | D/U | D/S | D | D | D | D | D | D | D | D/S |

TABLE 7

Modification to TDD UL-DL configuration 0 (denoted 0' and 0")

| TDD UL-DL Configuration | DL-to-UL Switch-point periodicity | TTI number | | | | | | | | | |
|---|---|---|---|---|---|---|---|---|---|---|---|
| | | 0 | 1 | 2 | 3 | 4 | 5 | 6 | 7 | 8 | 9 |
| 0' | 5 ms | D | S | U | U | U | D | S | U | U | S' |
| 0" | 5 ms | D | S | U | U | S' | D | S | U | U | S' |

TABLE 8

FDD UL-DL configuration 0, 0A, 0B

| TDD UL-DL Configuration | FDD UL-DL configuration | TTI/subframe number | | | | | | | | | |
|---|---|---|---|---|---|---|---|---|---|---|---|
| | | 0 | 1 | 2 | 3 | 4 | 5 | 6 | 7 | 8 | 9 |
| 0' | 0 | D/U | D/S | D | D | D | D | D | D | D | D/S |
| 0" | 0A | D/U | D/S | D | D | D/S | D/U | D/S | D | D | D/S |
| 0 | 0B | D/S | D/S | D | D | D | D/S | D/S | D | D | D |

Referring to FIG. 15, in determining the UL transmission behavior for a joint operation of a FDD carrier and a TDD carrier, at operation 1502, a UE considers whether FDD UL-DL configuration is enabled or not. If enabled, at operation 1504, the FDD UL-DL configuration of the FDD cell is implicitly determined from the TDD UL-DL configuration of the TDD cell and the UE performs UL frequency switching according to the FDD UL-DL configuration and the TDD UL-DL configuration. Otherwise, at operation 1506, the UE operates in the FDD cell in a conventional manner.

In an embodiment, a UE may not transmit signals in the UL for DL-only subframes. Table 9 shows a percentage of UL resource loss in a FDD cell. In a deployment scenario where the FDD cell is a macro cell and the TDD cell is a small cell (e.g. pico/femto cell), the loss of UL resources for FDD may be tolerable if most of the UE traffic is routed via the TDD cell. In addition, a network can adapt to an UL resource need of the FDD cell by reconfiguring the TDD UL-DL configuration and the FDD UL-DL configuration. For example, reconfiguring from TDD UL-DL configuration 2 to TDD UL-DL configuration 5 reduces the UL resource loss of the FDD cell from 60% to 30%.

TABLE 9

% UL resource loss to FDD cell

| FDD UL-DL configuration | % UL resource loss to FDD cell |
|---|---|
| 0 | 90% |
| 1 | 60% |
| 2 | 60% |
| 3 | 50% |
| 4 | 40% |
| 5 | 30% |
| 6 | 90% |

In another example embodiment, the FDD UL-DL configuration is explicitly signaled by the network. An UL transmission and frequency switching pattern is predefined for each FDD UL-DL configuration. Relying on the FDD UL-DL configuration, a UE may derive the TDD UL-DL configuration, even if the UE does not receive an explicit signaling of the TDD UL-DL configuration. For example, if the UE receives FDD UL-DL configuration 2 for the FDD (primary) cell, the UE may derive that the TDD UL-DL configuration for the TDD (secondary) cell is TDD UL-DL configuration 2 (according to Table 6).

In yet another example embodiment, both FDD UL-DL configuration and TDD UL-DL configuration are signaled by the network. When a same subframe for the two configurations has conflicting behavior such as, for example it is an UL subframe for both the FDD and the TDD UL-DL configurations, a rule can be predefined to resolve such conflict. In one example, the UE may be required to follow the FDD configuration because it is often the primary cell. In another example, the UE may be required to follow the configuration of the cell that is the primary cell. If the TDD cell is the primary cell, the UE shall follow the TDD configuration.

One or more embodiments provide UL HARQ-ACK timing and UL grant timing for FDD in FDD and TDD joint operation.

A UE may not be expected to be scheduled or configured to transmit on subframes that correspond to DL-only subframes or D/S subframes. Since the UE is supposed to transmit UL HARQ-ACK (in a PUCCH or in a PUSCH) for every unicast PDSCH it received and PUSCH for every UL DCI format it detected, there is a need to define a method to ensure PUCCH or PUSCH transmissions in subframes where UL transmissions are allowed (i.e., D/U subframes) in the FDD cell. Although in the following an HARQ-ACK transmission by a UE is considered to be in response to a respective PDSCH reception, it can also be in response to a DL DCI format releasing a previously SPS PDSCH (SPS release) but, for brevity, this will not be additionally mentioned.

In an example, a conventional UL HARQ-ACK timing and a conventional UL DCI format transmission timing of the FDD cell are maintained. This implies that a restriction should be imposed for unicast PDSCH and for PUSCH scheduling so that the UE does not need to transmit any UL signals in D and D/S subframes. Referring to Table 10, a UE can report UL HARQ-ACK and transmit PUSCH only if a PDSCH and an UL DCI format, respectively, are detected in the shaded subframes, wherein the shaded subframes are determined depending on the FDD UL-DL configuration. A first implication is that on subframes that are not shaded, the UE can be allowed to skip PDCCH decoding for DL DCI formats and UL DCI formats. A second implication is that a number of HARQ processes for the FDD cell can be reduced. Table 11 shows a maximum number of HARQ processes for the FDD cell where the maximum number depends on the FDD UL-DL configuration. This approach has the advantage that a conventional FDD HARQ timing is unchanged; however the scheduling restriction also means that unicast DL throughput is reduced.

TABLE 10

Subframes (shaded) where DL assignment and UL grant can be received on the FDD cell

| TDD UL-DL Configuration | FDD UL-DL configuration | TTI/subframe number | | | | | | | | | |
|---|---|---|---|---|---|---|---|---|---|---|---|
| | | 0 | 1 | 2 | 3 | 4 | 5 | 6 | 7 | 8 | 9 |
| 0' | 0 (Table 8) | D/U | D/S | D | D | D | D | D | D | D | D/S |
| 1 | 1 | D/U | D/S | D | D | D/S | D/U | D/S | D | D | D/S |
| 2 | 2 | D/U | D/S | D | D/S | D/U | D/U | D/S | D | D/S | D/U |
| 3 | 3 | D/U | D/S | D | D | D | D/S | D/U | D/U | D/U | D/U |
| 4 | 4 | D/U | D/S | D | D | D/S | D/U | D/U | D/U | D/U | D/U |
| 5 | 5 | D/U | D/S | D | D/S | D/U | D/U | D/U | D/U | D/U | D/U |
| 6 | 6 | D/U | D/S | D | D | D | D | D | D | D | D/S |

TABLE 11

Maximum number of HARQ processes for FDD assuming Table 10

| FDD UL-DL configuration | Maximum number of HARQ processes |
|---|---|
| 0 (Table 8) | 1 |
| 1 | 2 |
| 2 | 3 |
| 3 | 5 |
| 4 | 6 |
| 5 | 7 |
| 6 | 1 |

In another example, in order to minimize DL throughput loss on the FDD cell, UL HARQ-ACK timing for FDD is modified so that a UE can transmit HARQ-ACK, in response to a PDSCH received in subframe n, in an available UL subframe n+k where k≥4. The maximum number of HARQ processes can be kept as eight using this approach.

In an example embodiment of this example, a UE transmits HARQ-ACK in a first available UL subframe in order to minimize HARQ-ACK transmission latency. An example is given in Table 12 where a UE transmits a HARQ-ACK signal in subframe n in response to a PDSCH reception in subframe n−k where $k \in K_{FDD}$ and $K_{FDD}$:{$k_0, k_1, \ldots, k_{M_{FDD}-1}$} is called the DL association set index and $M_{FDD}$ is the HARQ-ACK bundling window size for the FDD cell.

Although the DL association set index in Table 12 minimizes latency between a DL subframe that a UE receives a PDSCH and an UL subframe the UE transmits respective HARQ-ACK information, it results in an imbalance of HARQ-ACK information payloads transmitted in respective UL TTIs. For example, for FDD UL-DL configuration 4, HARQ-ACK information corresponding to detection of data TBs for up to 5 DL subframes is transmitted in UL subframe 5 while HARQ-ACK information corresponding to detection of data TBs for up to 1 DL subframe is transmitted in UL subframe 0, 6, 7, 8 and 9. This imbalance can result to unequal reception reliability for HARQ-ACK information transmitted in different UL subframes and unequal respective coverage.

In another example embodiment of this example, a determination of a DL association set index for a FDD cell considers balancing a HARQ-ACK information payload for the FDD cell. One example is given in Table 13 where, for example for Configuration 3, the HARQ-ACK payload of subframe 6 in Table 10 is distributed to subframes 6, 7, 8, 9 and 0. Another example is given in Table 14 where HARQ-ACK for adjacent DL subframes is grouped in a single transmission. In both examples, for FDD UL-DL configuration 2, the HARQ-ACK bundling window size in UL subframe 4 and 9 is reduced from 4 to 3 while the HARQ-ACK bundling window size in UL subframe 0 and 5 is increased from 1 to 2 so that the HARQ-ACK information payload is more balanced across subframes.

TABLE 12

Downlink association set index $K_{FDD}$: {$k_0, k_1, \ldots, k_{M_{FDD}-1}$}:

| FDD UL-DL Configuration | TTI/subframe n | | | | | | | | | |
|---|---|---|---|---|---|---|---|---|---|---|
| | 0 | 1 | 2 | 3 | 4 | 5 | 6 | 7 | 8 | 9 |
| 0 (Table 8) | 13, 12, 11, 10, 9, 8, 7, 6, 5, 4 | — | — | — | — | — | — | — | — | — |
| 1 | 8, 7, 6, 5, 4 | — | — | — | — | 8, 7, 6, 5, 4 | — | — | — | — |
| 2 | 4 | — | — | — | 7, 6, 5, 4 | 4 | — | — | — | 7, 6, 5, 4 |
| 3 | 4 | — | — | — | — | — | 9, 8, 7, 6, 5, 4 | 4 | 4 | 4 |
| 4 | 4 | — | — | — | — | 8, 7, 6, 5, 4 | 4 | 4 | 4 | 4 |
| 5 | 4 | — | — | — | 7, 6, 5, 4 | 4 | 4 | 4 | 4 | 4 |
| 6 | 13, 12, 11, 10, 9, 8, 7, 6, 5, 4 | — | — | — | — | — | — | — | — | — |

TABLE 13

Downlink association set index $K_{FDD}$: $\{k_0, k_1, \ldots, k_{M_{FDD}-1}\}$:

| FDD UL-DL Configuration | TTI n | | | | | | | | | |
|---|---|---|---|---|---|---|---|---|---|---|
| | 0 | 1 | 2 | 3 | 4 | 5 | 6 | 7 | 8 | 9 |
| 0 (Table 8) | 13, 12, 11, 10, 9, 8, 7, 6, 5, 4 | — | — | — | — | — | — | — | — | — |
| 1 | 8, 7, 6, 5, 4 | — | — | — | — | 8, 7, 6, 5, 4 | — | — | — | — |
| 2 | 5, 4 | — | — | — | 7, 6, 5 | 5, 4 | — | — | — | 7, 6, 5 |
| 3 | 8, 4 | — | — | — | — | — | 9, 8 | 8, 4 | 8, 4 | 8, 4 |
| 4 | 4 | — | — | — | — | 8, 7 | 7, 4 | 7, 4 | 7, 4 | 4 |
| 5 | 4 | — | — | — | 7, 6 | 5, 4 | 5, 4 | 4 | 4 | 4 |
| 6 | 13, 12, 11, 10, 9, 8, 7, 6, 5, 4 | — | — | — | — | — | — | — | — | — |

TABLE 14

Downlink association set index $K_{FDD}$: $\{k_0, k_1, \ldots, k_{M_{FDD}-1}\}$:

| FDD UL-DL Configuration | TTI n | | | | | | | | | |
|---|---|---|---|---|---|---|---|---|---|---|
| | 0 | 1 | 2 | 3 | 4 | 5 | 6 | 7 | 8 | 9 |
| 0 (Table 8) | 13, 12, 11, 10, 9, 8, 7, 6, 5, 4 | — | — | — | — | — | — | — | — | — |
| 1 | 8, 7, 6, 5, 4 | — | — | — | — | 8, 7, 6, 5, 4 | — | — | — | — |
| 2 | 5, 4 | — | — | — | 7, 6, 5 | 5, 4 | — | — | — | 7, 6, 5 |
| 3 | 5, 4 | — | — | — | — | — | 9, 8 | 8, 7 | 7, 6 | 6, 5 |
| 4 | 4 | — | — | — | — | 8, 7 | 7, 6 | 6, 5 | 5, 4 | 4 |
| 5 | 4 | — | — | — | 7, 6 | 5, 4 | 5, 4 | 4 | 4 | 4 |
| 6 | 13, 12, 11, 10, 9, 8, 7, 6, 5, 4 | — | — | — | — | — | — | — | — | — |

Combinations of the above example embodiments for a determination of a DL association set index $K_{FDD}$ for a FDD cell (which for some FDD UL-DL configuration is same between the example and the other example) can also be considered depending on a FDD UL-DL configuration. For example, for FDD UL-DL configuration 2, Table 12 can be considered while for FDD UL-DL configuration 3, Table 13 or Table 14 can be considered. Moreover, it is noted that unlike the ordering of DL subframes in Table 2 for reporting respective HARQ-ACK information for a TDD cell, an ordering of DL subframes for reporting respective HARQ-ACK information for a FDD cell is according to the order of the DL subframes. This is because for special DL subframes in a TDD cell, a DL subframe with a same index is a normal DL subframe in a FDD cell.

In an embodiment, the maximum HARQ-ACK information payload in an UL subframe of a FDD cell can be determined by the HARQ-ACK bundling window size, $M_{FDD}$, the downlink transmission mode, and n other relevant RRC configuration parameter(s), where n=0, 1, 2 for example. When $M_{FDD}=1$, a UE shall use either Format 1a or Format 1b to transmit the HARQ-ACK payload. When $2 \leq M_{FDD} \leq 0.4$, a UE shall use PUCCH format 1b with channel selection to convey the HARQ-ACK payload. When $M_{FDD} > 4$, a UE can use either PUCCH format 3 or PUCCH format 1b to convey the HARQ-ACK payload. In general, a UE transmits HARQ-ACK in a PUCCH of the FDD cell as in case of a TDD cell with $M_{TDD}$ replaced by $M_{FDD}$.

For FDD UL-DL configuration 1, $M_{FDD}$ is 5 for UL subframe 0 and 5. Assuming that a downlink transmission mode supporting one data transport block is configured and assuming that HARQ-ACK compression techniques time-domain bundling are not applied, the PUCCH format that can be used to carry the HARQ-ACK payload is PUCCH format 3 (PUCCH format 1b with channel selection is not possible since $M_{FDD} > 4$). To enable PUCCH format 1b with channel selection to be used in this case, an embodiment may reduce $M_{FDD}$ to 4. In an example of an embodiment, a network scheduling restriction can be imposed so that can be assumed to be 4. For example, the network can only schedule in subframe n−k where k∈{7,6,5,4}. In another example of the embodiment, HARQ-ACK bundling can be applied to two of the five subframes. For example, time-domain HARQ-ACK bundling can be applied using the logical AND operation on subframe n−4 and n−5. The above examples can be applied to other cases where reduction of would enable more PUCCH formats (that can be preferred because of superior reliability) to be available for carrying the HARQ-ACK payload. For example, the above approaches can also be applied to subframe 4 FDD UL-DL configuration 2 of Table 13 or Table 14 so that the maximum HARQ-ACK payload can be capped at 4 assuming a downlink transmission mode that supports two transport blocks is configured.

In an embodiment, the maximum number of HARQ-ACK information payload can be reduced further for the FDD cell if HARQ-ACK compression techniques such as spatial-domain bundling (bundling across codewords for DL transmission modes supporting two transport blocks) and/or time-domain bundling (bundling across subframes, per codeword) are applied or configured to the UE. For time-domain bundling, logical AND operation can be performed on the HARQ-ACKs corresponding to subframe n−k where k∈$\{k_0, k_1, \ldots, k_{M_{FDD}-1}\}$. In this case, the HARQ-ACK payload size is reduced to only up to 2 bits per subframe (1 bit for transmission mode with one transport block) and PUCCH format 1b can be used to carry the HARQ-ACK payload (or PUCCH format 1a for transmission mode with one transport block). Partial time-domain bundling is also possible by bundling only a subset subframes in the set {$k_0$, $k_1, \ldots, k_{M_{FDD}-1}$}, e.g. for FDD UL-DL configuration 6, {13,12,11,10,9} and {8,7,6,5,4} can be bundled separately. For spatial-domain bundling, logical AND operation can be performed on the HARQ-ACKs across codewords, per subframe. A combination of time-domain bundling and spatial-domain bundling is also possible.

One or more embodiments provides benefit if HARQ-ACK payload is compressed such as only up to 4 bits HARQ-ACK payload is needed to be transmitted in a subframe. In an example, PUCCH format 3 may not be used or configured for the FDD cell. This can be achieved with time-domain bundling or spatial domain bundling or a combination of both techniques.

Figure 16:
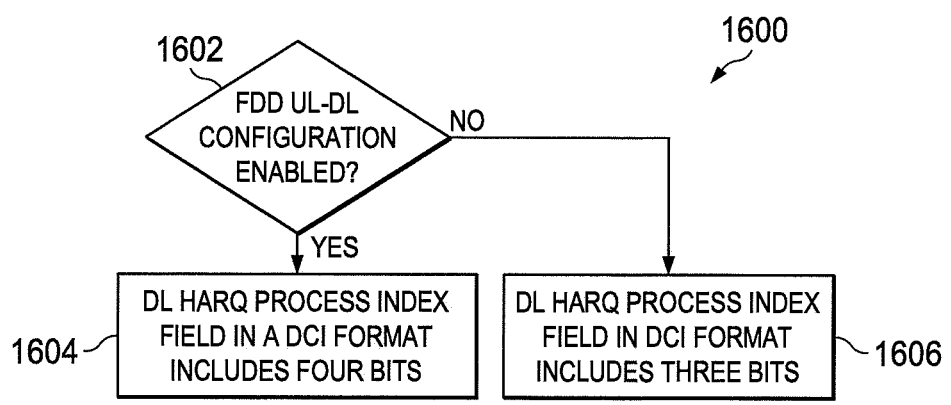
FIG. 16 illustrates an example process for determining the number of bits for a DL HARQ process index field of an FDD cell according to this disclosure.

FIG. 16 illustrates an example process 1600 for determining the number of bits for a DL HARQ process index field of an FDD cell according to this disclosure. The UE here may represent the UE 116 in FIGS. 1 and 3. The embodiment of the process 1600 shown in FIG. 16 is for illustration only. Other embodiments of the process 1600 could be used without departing from the scope of this disclosure.

One or more embodiments provides a DL HARQ process field, DL DAI field, and UL DAI Field in respective DCI formats for a FDD cell in case of a FDD and TDD joint operation.

When a UE is configured with a TDD cell and a FDD cell with FDD UL-DL configuration as described above, a transmission timing of UL HARQ-ACK information in a PUCCH in response to detecting one or more DL DCI formats for the FDD cell is determined by an availability of UL subframes in the FDD cell and, unlike conventional FDD operation, it cannot occur in every subframe. Therefore, a bundling window size for transmission of HARQ-ACK information in response to detecting one or more DL DCI formats can be larger than 1. Due to an additional latency required for a UE to report HARQ-ACK information in response to detecting one or more DL DCI formats for the FDD cell, a larger number of DL HARQ processes for PDSCH transmissions in the FDD cell needs to be supported compared to the case of a legacy FDD cell. For example, considering a delay of 3 subframes between an end of a PDSCH transmission from a NodeB and an availability of a respective HARQ-ACK information at a UE, a delay of 4 subframes between a beginning of a HARQ-ACK transmission at a UE and an availability of a scheduling decision for a same HARQ process at a NodeB, and a delay of up to 13 subframes for reporting HARQ-ACK information in the case of FDD UL-DL configuration 0 and 6 (as indicated in Table 12, Table 13 and Table 14), a maximum delay of 17 subframes can occur thereby necessitating a use of 17 HARQ processes. Table 15 shows the maximum number of HARQ processes for each FDD UL-DL configuration.

In a situation of CA between a TDD cell and a FDD cell, a DL HARQ process index field in a DL DCI format for the FDD secondary cell includes a larger number of bits than in case of a legacy FDD cell (including single-cell FDD operation). In one method, this number of bits for the DL HARQ process index field can be 5, to support up to 17 HARQ processes. However, only FDD UL-DL configuration 0 and 6 needs 17 HARQ processes and many of the 5-bit DL HARQ process index field are not used.

In another embodiment, the maximum number of HARQ processes for FDD UL-DL configuration 0 and 6 is defined to be 16, hence the number of bits for the DL HARQ process index field can be 4 (same as the one for the DL HARQ process index field in a DL DCI format for a TDD cell). For FDD UL-DL configuration 0 and 6, the UE assumes only up to 16 HARQ processes. This method is illustrated in FIG. 16.

Referring to FIG. 16, in detecting a DL DCI format for a FDD cell, at operation 1602, a UE considers whether FDD UL-DL configuration is enabled. If enabled, at operation 1604, a DL HARQ process index field in a DL DCI format for the UE includes 4 bits; else, at operation 1606, a DL HARQ process index field in a DL DCI format for the UE includes 3 bits. In yet another method, the number of bits for the DL HARQ process index field can depend on the FDD UL-DL configuration. For example, the number of bits for the DL HARQ process index field is 5 if FDD UL-DL configuration 0 and 6 is configured and the number of bits for the DL HARQ process index field is 4 otherwise.

TABLE 15

Maximum number of HARQ processes for FDD cell

| FDD UL-DL configuration | Maximum number of HARQ processes according to Table 9 or Table 10 or Table 11 |
|---|---|
| 0 (Table 8) | 17 |
| 1 | 12 |
| 2 | 11 |
| 3 | 13 |
| 4 | 12 |
| 5 | 11 |
| 6 | 17 |

Similar to the DL HARQ process index field, as transmission of HARQ-ACK information from a UE cannot typically occur in successive TTIs, a respective bundling window size for a FDD cell can be larger than 1 TTI. Therefore, in case FDD UL-DL configuration is enabled, a DL DCI format for the FDD cell needs to include a DL DAI field that functions as a counter of a DL DCI format in a bundling window similar to the DL DAI field in DL DCI format for a TDD cell. This existence of a DL DAI field in a DL DCI format in case of a TDD cell, in conjunction with an equal size for a DL HARQ process index field in DL DCI formats for the TDD cell and a FDD cell, result to a DL DCI format having a same size regardless of whether it is intended for a TDD cell or a FDD cell. It is noted that a DL DAI field for a FDD cell can include 2 bits even though can be larger than 4 and a UE can determine an index for a respective DL DCI format in a bundling window based on an index of a last detected DL DCI format within a same bundling window. For example, a DL DAI field binary value of '00' can map either to a DL DCI format index of either 1, or 5 (if applicable), or (if applicable) 9 within a same bundling window and a UE can determine a value of 5 if it previously detected a single DL DCI format including a DL DAI field with binary value of '01', or '10', or '11'.

Figure 17:
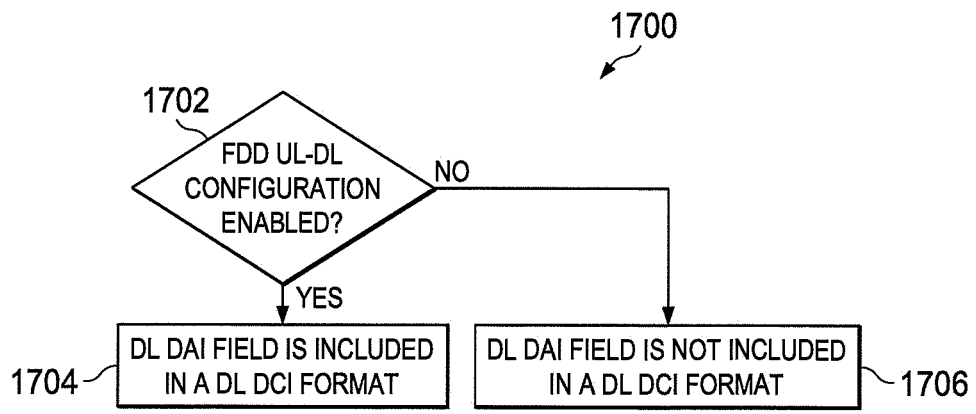
FIG. 17 illustrates an example process for determining an existence of a DL DAI field in a DL DCI format depending on whether a primary cell is an FDD cell or a TDD cell according to this disclosure.

FIG. 17 illustrates an example process 1700 for determining an existence of a DL DAI field in a DL DCI format depending on whether a primary cell is an FDD cell or a TDD cell according to this disclosure. The UE here may represent the UE 116 in FIGS. 1 and 3. The embodiment of the process 1700 shown in FIG. 17 is for illustration only. Other embodiments of the process 1700 could be used without departing from the scope of this disclosure.

Referring to FIG. 17, in detecting a DL DCI format for a FDD cell or a TDD cell, at operation 1702, a UE considers whether FDD UL-DL configuration is enabled or not. If enabled, at operation 1704, a DL DAI field is included in a DL DCI format for the UE. Otherwise, at operation 1704, the UE operates in the FDD cell in the legacy manner and a DL DAI field is not included in a DL DCI format for the UE.

For operation in a FDD cell, an UL DAI field indicating to a UE to multiplex HARQ-ACK information in a PUSCH transmission may not need to be included in an UL DCI format scheduling the PUSCH transmission. This is because HARQ-ACK information is generated in response to a DL DCI format that is transmitted in a same TTI (and in a same cell) as an UL DCI format scheduling a PUSCH transmission, and therefore it is highly likely that a UE either detects both DCI formats or misses both DCI formats, and because HARQ-ACK information in response to a DL DCI format detection in a previous TTI is already transmitted in a respective previous PUSCH or PUCCH. Therefore, an additional explicit indication to a UE, through a use of an UL DAI field in an UL DCI format, to multiplex HARQ-ACK information in a PUSCH transmission is not essential.

For operation with UL frequency switching, HARQ-ACK information in response to a detection of DL DCI format for a FDD cell in a previous TTI may not be transmitted prior to a TTI where a UE transmits a PUSCH in a FDD cell. This is because a respective UL TTI may not exist for the FDD UL-DL configuration in order for a UE to transmit that HARQ-ACK information in a PUCCH or because a UE may not have a PUSCH transmission in a previous TTI in order to multiplex that HARQ-ACK information in the transmitted PUSCH. Therefore, a PUSCH transmission in a FDD cell may need to include HARQ-ACK information in response to detections of DL DCI formats, in respective TTIs prior to the TTI of an UL DCI format detection scheduling the PUSCH transmission. It is noted that an UL DAI field for a FDD cell (with FDD UL-DL configuration) can include 2 bits even though can be larger than 4 and a UE can determine a number of HARQ-ACK information bits to multiplex based on a value of the UL DAI field and also based on a number of detected DL DCI formats within a same bundling window.

Figure 18:
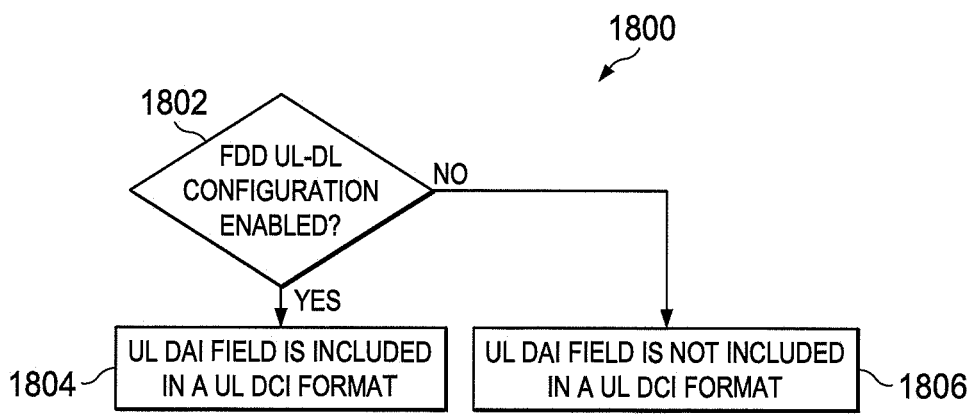
FIG. 18 illustrates an example process for determining an existence of an UL DAI field in a DL DCI format depending on whether a FDD UL-DL configuration is enabled or not according to this disclosure.

FIG. 18 illustrates an example process 1800 for determining an existence of an UL DAI field in a DL DCI format depending on whether a FDD UL-DL configuration is enabled or not according to this disclosure. The UE here may represent the UE 116 in FIGS. 1 and 3. The embodiment of the process 1800 shown in FIG. 18 is for illustration only. Other embodiments of the process 1800 could be used without departing from the scope of this disclosure.

Referring to FIG. 18, in detecting an UL DCI format for a FDD cell, at operation 1802, a UE considers whether FDD UL-DL configuration is enabled or not. If enabled, at operation 1804, an UL DAI field is included in an UL DCI format for the UE. Otherwise, at operation 1806, the UE operates with a legacy FDD cell, an UL DAI field is not included in an UL DCI format for the UE.

Upon detection of an UL DCI format that includes an UL DAI field with a value of $V_{DAI}^{UL}$ and schedules a PUSCH in a TTI where a UE can multiplex HARQ-ACK information in a PUCCH, a UE multiplexes in the PUSCH $O_{FDD}$·min$(V_{DAI}^{UL}, M_{FDD})$ if PUCCH format 3 is configured for the FDD cell, where $O_{FDD}$ is the maximum number of HARQ-ACK bits per subframe for the FDD cell. A UE can determine an association between a DL TTI and respective HARQ-ACK information from a value of a DL DAI field in each detected DCI format.

One or more embodiments provide UL switching as a function of UE Buffer Status Report (BSR).

In order to facilitate the UL switching configuration as described above, it can be beneficial for a network node controlling the RRC configuration of the UE (typically the eNodeB controlling the primary cell) to obtain the UE's buffer status report(s) for the other carrier(s). In this way the network can make an appropriate decision on the TDD UL-DL configuration and the FDD UL-DL configuration for the UE. The UE's buffer status reports for the other carriers can be obtained via X2 signaling from the other eNodeBs or directly from the UE if the BSRs for multiple carriers are transmitted at least on the primary cell.

The UL switching behavior can also be determined implicitly by the UE's buffer status for each carrier. If the UE does not have any data in its buffer for a particular carrier, the UE does not need to switch to the corresponding UL carrier frequency for UL data transmission other than to transmit HARQ-ACK, CSI and SRS. Therefore, based on knowledge of a BSR for each respective carrier, a network can either enable carrier switching for UL transmissions, as described above, or indicate to the UE to suspend carrier switching for UL transmission with the possible exception of PUCCH or SRS transmissions. UL switching can again be activated after a UE reports a non-empty buffer for a particular carrier. The above can be particularly applicable in case a secondary cell supports delay-tolerant services while delay-sensitive services are supported in the primary cell.

Separate HARQ-ACK timing can be defined for the situation where the UL carrier switching is perform less frequently than described above so that a UE can provide to a secondary cell HARQ-ACK feedback in a single UL subframe per frame (or less frequently than a frame) where the HARQ-ACK feedback is in response to PDSCH receptions in the secondary cell over multiple DL subframes.

In another embodiment, that can be beneficial to delay-sensitive services, UL switching is initiated by the UE. In order to avoid delays associated with higher layer signaling of a BSR or backhaul delays associated with inter-eNodeB information exchange, a UE can be configured to transmit a "switch indicator" in a PUCCH. The switch indicator conveys a 1-bit information where a positive value (such as a binary 0) indicates that to a primary cell that the UE has data to transmit in the secondary cell (and thus requests UL carrier switching, as described above, to be enabled) and a negative value (such as a binary 1) indicates that the UE has an empty buffer for UL data to the secondary cell and request UL carrier switching to be disabled. The PUCCH structure for the transmission of the switch indicator can be as for PUCCH format 1a.

One or more embodiments provide for FDD and FDD joint operation with non-ideal backhaul.

The embodiments described above can be extended to the case of FDD and FDD joint operation/carrier aggregation with non-ideal backhaul between carriers (inter-eNodeB CA). When an FDD cell (cell 1) is aggregated with another FDD cell (cell 2), the UL frequency switching pattern of cell 2 can complement that of cell 1. For example, if cell 1 is configured an UL frequency switching pattern defined by FDD UL-DL configuration 4 as in Table 6, the corresponding UL frequency switching pattern for cell 2 can be D for subframe 0, 5, 6, 7, 8 and 9; D/S for subframe 1 and 4; D/U for subframe 2 and 3. For each FDD UL-DL configuration in Table 6, there is a corresponding complementary FDD UL-DL configuration. This is illustrated in Table 16 (where the original FDD UL-DL configuration 6 in Table 6 has been removed since it is the same as configuration 0). When a first FDD cell is configured with a first FDD UL-DL configuration, the UE can determine a second FDD UL-DL configuration of a second FDD cell; hence explicit signaling of the FDD UL-DL configuration for the second FDD cell is not needed.

TABLE 16

FDD UL-DL configurations for FDD and FDD carrier aggregation with non-ideal backhaul.

| FDD UL-DL Config | \multicolumn{10}{c}{TTI/subframe number} | Comment |
|---|---|---|---|---|---|---|---|---|---|---|---|
| | 0 | 1 | 2 | 3 | 4 | 5 | 6 | 7 | 8 | 9 | |
| 0 (Table 8) | D/U | D/S | D | D | D | D | D | D | D | D/S | Complementary to 7 |
| 1 | D/U | D/S | D | D | D/S | D/U | D/S | D | D | D/S | Complementary to 8 |
| 2 | D/U | D/S | D | D/S | D/U | D/U | D/S | D | D/S | D/U | Complementary to 9 |
| 3 | D/U | D/S | D | D | D | D/S | D/U | D/U | D/U | D/U | Complementary to 10 |
| 4 | D/U | D/S | D | D | D/S | D/U | D/U | D/U | D/U | D/U | Complementary to 11 |
| 5 | D/U | D/S | D | D/S | D/U | D/U | D/U | D/U | D/U | D/U | Complementary to 12 |
| 6 | D/U | D/S | D | D | D | D | D | D | D | D/S | Complementary to 7 |
| 7 | D | D/S | D/U | D/U | D/U | D/U | D/U | D/U | D/U | D/S | Complementary to 0 and 6 |
| 8 | D | D/S | D/U | D/U | D/S | D | D/S | D/U | D/U | D/S | Complementary to 1 |
| 9 | D | D/S | D/U | D/S | D | D | D/S | D/U | D/S | D | Complementary to 2 |
| 10 | D | D/S | D/U | D/U | D/U | D/S | D | D | D | D | Complementary to 3 |
| 11 | D | D/S | D/U | D/U | D/S | D | D | D | D | D | Complementary to 4 |
| 12 | D | D/S | D/U | D/S | D | D | D | D | D | D | Complementary to 5 |

It follows that the DL association set index table $K_{FDD}$ also needs to be expanded to include FDD UL-DL configurations 6-11 of Table 16. Further details are omitted here as they can be easily worked out using the embodiments described herein.

The embodiments described above can be applied to the case of carrier aggregation between two FDD cells.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method implemented in a user equipment (UE) used in a wireless communications system, comprising:
   transmitting an indication to a base station that the UE is capable of transmitting on a single uplink carrier frequency and downlink carrier aggregation;
   receiving an uplink carrier frequency switching pattern from the base station;
   switching uplink carrier frequencies based on the uplink carrier frequency switching pattern.

2. The method of claim 1, wherein the uplink carrier frequency switching pattern configures the UE to switch uplink carrier frequencies periodically over a specified duration.

3. The method of claim 1, wherein the uplink carrier frequency switching pattern configures the UE to switch uplink carrier frequencies when receiving a command from the base station.

4. The method of claim 1, wherein the UE switches the uplink carrier frequencies over a switching period, and further comprising:
   if the switching period is over a single slot, transmitting sounding reference signals in a next slot; and
   if the switching period is over a subframe, transmitting uplink signals in a next subframe.

5. The method of claim 1, wherein the base station utilizes frequency division duplexing (FDD) and another base station utilizes time division duplexing (TDD), wherein receiving the uplink carrier frequency switching pattern from the base station comprises;
   receiving a TDD uplink-downlink configuration from the other bases station and a FDD uplink-downlink configuration from the base station,
   wherein the TDD uplink-downlink configuration and the FDD uplink-downlink configuration indicate which subframes of a plurality of subframes for both the base station and the other base station are available for uplink, downlink, or special transmission.

6. The method of claim 5, wherein uplink subframes in the TDD uplink-downlink configuration are not available for uplink transmission in the FDD uplink-downlink configuration.

7. The method of claim 6, further comprising:
   restricting downlink unicast signal reception to subframes that allow for uplink signals to be transmitted a selected number of subframe after the downlink signal reception.

8. A method implemented in a base station used in a wireless communications system, comprising:
   receiving an indication that a user equipment (UE) is capable of transmitting on a single uplink carrier frequency and downlink carrier aggregation; and
   transmitting an uplink carrier frequency switching pattern from the base station,
   wherein the UE switches uplink carrier frequencies based on the uplink carrier frequency switching pattern.

9. The method of claim 8, wherein the uplink carrier frequency switching pattern configures the UE to switch uplink carrier frequencies periodically over a specified duration.

10. The method of claim 8, wherein the uplink carrier frequency switching pattern configures the UE to switch uplink carrier frequencies when receiving a command from the base station.

11. A user equipment (UE) used in a wireless communications system, comprising,
    a transceiver configured to transmit an indication to a base station that the UE is capable of transmitting on a single uplink carrier frequency and downlink carrier aggregation and receive an uplink carrier frequency switching pattern from the base station;
    a controller configured to switch uplink carrier frequencies based on the uplink carrier frequency switching pattern.

12. The UE of claim 11, wherein the uplink carrier frequency switching pattern configures the UE to switch uplink carrier frequencies periodically over a specified duration.

13. The UE of claim 11, wherein the uplink carrier frequency switching pattern configures the UE to switch uplink carrier frequencies when receiving a command from the base station.

14. The UE of claim 11, wherein the UE switches the uplink carrier frequencies over a switching period, and wherein the transceiver is further configured to:
   if the switching period is over a single slot, transmit sounding reference signals in a next slot; and
   if the switching period is over a subframe, transmit uplink signals in a next subframe.

15. The UE of claim 11, wherein the base station utilizes frequency division duplexing (FDD) and another base station utilizes time division duplexing (TDD), wherein the transceiver configured to receive the uplink carrier frequency switching pattern from the base station comprises the transceiver configured to;
   receive a TDD uplink-downlink configuration from the other bases station and a FDD uplink-downlink configuration from the base station,
   wherein the TDD uplink-downlink configuration and the FDD uplink-downlink configuration indicate which subframes of a plurality of subframes for both the base station and the other base station are available for uplink, downlink, or special transmission.

16. The UE of claim 15, wherein uplink subframes in the TDD uplink-downlink configuration are not available for uplink transmission in the FDD uplink-downlink configuration.

17. The UE of claim 16, wherein the controller is further configured to:
   restrict downlink unicast signal reception to subframes that allow for uplink signals to be transmitted a selected number of subframe after the downlink signal reception.

18. A base station used in a wireless communications system, comprising:
   a transceiver configured to receive an indication that a user equipment (UE) is capable of transmitting on a single uplink carrier frequency and downlink carrier aggregation and transmit an uplink carrier frequency switching pattern from the base station,
   wherein the UE switches uplink carrier frequencies based on the uplink carrier frequency switching pattern.

19. The base station of claim 18, wherein the uplink carrier frequency switching pattern configures the UE to switch uplink carrier frequencies periodically over a specified duration.

20. The base station of claim 18, wherein the uplink carrier frequency switching pattern configures the UE to switch uplink carrier frequencies when receiving a command from the base station.

* * * * *